United States Patent [19]
Shono et al.

[11] Patent Number: 5,719,649
[45] Date of Patent: Feb. 17, 1998

[54] LIGHT GUIDE AND LIQUID CRYSTAL DISPLAY DEVICE USING IT

[75] Inventors: Yasuo Shono, Tokyo; Yasoji Suzuki; Yoshinori Higuchi, both of Yokohama; Naoto Ide, Himeji, all of Japan

[73] Assignee: Kabushiki Kaisha Toshiba, Kanagawa-ken, Japan

[21] Appl. No.: 466,796

[22] Filed: Jun. 6, 1995

[30] Foreign Application Priority Data

| Jun. 8, 1994 | [JP] | Japan | 6-126319 |
| Mar. 29, 1995 | [JP] | Japan | 7-070287 |
| Mar. 29, 1995 | [JP] | Japan | 7-070288 |
| Mar. 29, 1995 | [JP] | Japan | 7-070289 |
| May 29, 1995 | [JP] | Japan | 7-130336 |

[51] Int. Cl.$^6$ ............................................. G02F 1/1335
[52] U.S. Cl. ..................................... 349/65; 362/31
[58] Field of Search .......................... 349/62, 64, 65; 362/31

[56] References Cited

U.S. PATENT DOCUMENTS

| 5,420,761 | 5/1995 | DuNah et al. | 362/31 |
| 5,485,354 | 1/1996 | Ciupke et al. | 349/62 |
| 5,489,999 | 2/1996 | Matsumoto | 349/62 |
| 5,550,657 | 8/1996 | Tanaka et al. | 349/62 |
| 5,555,109 | 9/1996 | Zimmerman et al. | 349/62 |

FOREIGN PATENT DOCUMENTS

| 62-284289 | 1/1990 | Japan . |
| 5-226414 | 9/1993 | Japan . |

*Primary Examiner*—William L. Sikes
*Assistant Examiner*—Charles Miller
*Attorney, Agent, or Firm*—Finnegan, Henderson, Farabow, Garrett & Dunner, L.L.P

[57] ABSTRACT

On a light exit surface which is the first principal plane of a light guide, multiple projections are fabricated in specific rows. These projections have light exit surfaces and continuous multiple slopes, and are fabricated from optically identical materials having the same refractive index as the substrate of the light guide. The slope farthest from the light entry edge surface is formed as a light exit surface, i.e., a surface which breaks the conditions for the total reflection of the incident light. On the other hand, the slope nearest the light entry edge surface which is the total reflection surface is formed such that the incident light is totally reflected.

27 Claims, 13 Drawing Sheets

LIGHT GUIDE AND LIQUID CRYSTAL DISPLAY DEVICE USING IT

BACKGROUND OF THE INVENTION

1. Field of the Invention

This invention relates to a light guide used as back light source in a liquid crystal display device and to a liquid crystal display that uses it. More particularly, this invention relates to a side lighting (edge lighting) light guide and to a liquid crystal display device that uses it.

2. Description of the Related Art

Two known systems used as back light source for light receiving type display devices such as liquid crystal display devices are the directly-beneath illumination system and the side-lighting (edge-lighting) system. The directly-beneath illumination system uses multiple straight tubular fluorescent lamps lined up at the back of a liquid crystal panel or a flat luminous element such as an EL (electro luminescence) luminous element. The side-light (edge-light) system uses one or two straight tubular compact fluorescent lamps or an arrayed LED (light emitting diode) placed at the side of a light guide installed on top of a liquid crystal panel.

In the side-lighting system described above, a light guide is generally placed at the back of a liquid crystal panel and a light source is installed at the edge of the light guide. A light-diffusing dot or an irregular reflection surface is provided on the inward principal plane of this light guide. The light source light displayed through the light transmission control action of the liquid crystal panel is then supplied to the liquid crystal panel by diffusing and releasing or irregularly reflecting the illuminating light from the light source toward the liquid crystal panel.

However, in liquid crystal display devices using conventional light guides, light components which diagonally cross the interior of the liquid crystal panel are not controlled, thus allowing diffused light to enter the liquid crystal panel. Therefore, depending on the direction of the light components entering the liquid crystal panel, the retardation value And (where n is the optical refractive index and d is the length of the optical path) differs, resulting in poor contrast.

In addition, in liquid crystal display devices using conventional light guides, optical loss is high. Thus, it is necessary to increase the light source output to improve the brightness of the liquid crystal display device. This in turn leads to increased power consumption. Accordingly, this makes it difficult to minimize the power consumption of the entire liquid crystal display device.

Moreover, in liquid crystal display devices using conventional light guides, light power decreases with light source distance because of optical losses within the light guide. This create causes uneven brightness, depending on the position of the display panel.

Furthermore, liquid crystal display devices using conventional light guides have a viewing angle characteristic which is unique to the liquid crystal panel. Generally, for instance, compared with other liquid crystal display devices such as CRTs, there is the problem that the viewing angle is not only narrow but also inclined.

SUMMARY OF THE INVENTION

According to this invention, there is provided:

1. A light guide using at least one side of a flat substrate as a light entry surface and the first principal plane of the substrate intersecting the light entry surface as a light exit surface, including multiple projections placed within the light exit principal plane and which are fabricated from materials optically identical with the substrate, the projection comprising a light exit surface whereby, from among multiple slopes comprising each projection, the main slope farthest from the light entry surface transmits incident light and a surface which fulfills the conditions for total reflection of incident light by slopes other than the main slope.

2. The light guide described in #1 wherein, from among the light exit main surfaces, all surfaces other than the light exit surface of the projection fulfill the conditions for total reflection of incident light.

3. The light guide described in #1 wherein all surfaces other than the light exit principal plane fulfill the conditions for total reflection of incident light.

4. The light guide described in #1 wherein the multiple projections are placed such that the further they are from the light entry surface, the bigger they are.

5. The light guide described in #1 wherein the multiple projections are of identical volume and are fabricated such that the further they are from the light entry surface, the bigger density they occupy on the light exit surface.

6. A liquid crystal display device having a liquid crystal panel wherein a liquid crystal layer is held between two parallel boards and a light guide installed at the back of the panel, the liquid crystal display device using the light guide as a light guide and having an optical element that controls the optical path of the emergent light from the light guide intervened between the liquid crystal panel and the light exit surface of the light guide.

7. The liquid crystal display device described in #6 wherein the pitch of the projection of the light guide is smaller than the pitch of the pixel comprising the liquid crystal panel.

8. The liquid crystal display device described in #6 wherein the optical element is a prism sheet.

9. The liquid crystal display device described in #8 wherein the pitch of the prism comprising the prism sheet is smaller than the pixel comprising the liquid crystal panel.

10. The liquid crystal display device described in 8 wherein the pitch of the prism comprising the prism sheet is smaller than the pixel comprising the liquid crystal panel and larger than the pitch of the projections of the light guide.

11. The liquid crystal display device described in #6 wherein the optical element can switch over between a system which transmits emergent light from the light guide and a system which scatters the certain emergent light.

12. The liquid crystal display device described in #11 wherein the optical element is a high polymer dispersing liquid crystal cell.

13. The liquid crystal display device described in #11 wherein one board of the high polymer liquid crystal has polarizing ability.

14. The liquid crystal display device described in #6, wherein the optical element that controls the optical path of emergent light of the liquid crystal panel is placed on the front face of one of the two parallel boards, i.e., the board located on the front side as seen from the viewing side of the liquid crystal panel.

15. The liquid crystal display device described in #6, wherein a polarizing element is intervened between the light exit principal plane of the light guide and the light source.

16. A panel light source device comprising a tube light source and alight guide which propagates the light source light from the tube light source, wherein, the light guide includes multiple projections which are installed on the first principal plane side of the light guide and integrated with the light guide for the purpose of optionally releasing from the first principal plane of the light guide the light source light propagating inside the light guide, and a light path changing means installed on the second principal plane opposite to the first principal plane of the light guide and integrated with the light guide for the purpose of optionally releasing the light source light propagating inside the light guide from the first principal plane of the light guide.

17. A panel light source wherein each of the projections in the panel light source device described in #16 has a triangular cross section and includes a first exit surface from which the light source light from the tube light source propagating inside the light guide is released outside the light guide and a first reflection surface which either guides to the first exit surface of the light source, or reflects inside the light guide the light source light from the tube light source propagating inside the light guide.

18. A panel light source wherein the light path changing means described in #16 is fabricated on the second principal plane and includes multiple second reflection surfaces that reflect the light source light on the first principal plane of the light guide.

19. A panel light source wherein the first reflection surface described in #18 is installed between the second reflection surfaces.

20. A display device which includes a panel light source comprising of a display panel having an effective display region made up of multiple display pixels and a light guide which propagates the light source light from a tube light source and the tube light source.

The light guide includes multiple projections which are installed on the first principal plane side of the light guide and integrated with the light guide for the purpose of optionally releasing from the first principal plane of the light guide the light source light propagating inside the light guide, and a light path changing means installed on the second principal plane opposite the first principal plane of the light guide and integrated with the light guide for the purpose of optionally releasing from the first principal plane of the light guide the light source light propagating inside the light guide.

21. A panel light source which includes a tube light source and a light guide having multiple projections on the first principal plane, the projections optionally releasing light source light from the tube light source.

A panel light source wherein the tube light source is stored within the thickness of the light source; the panel light source further includes a storage section having a light entry surface fabricated within the thickness to guide the light source light from the tube light source into the light guide.

22. A panel light source wherein each of the projections described in #16 has a triangular cross section and includes an exit surface from which the light source light from the tube light source propagating inside the light guide is released outside the light guide and a reflection surface which either guides to the first exit surface of the light source, or reflects inside the light guide the light source light from the tube light source propagating inside the light guide.

23. A display device which includes a panel light source comprising, a display panel having an effective display region having multiple display pixels, a tube light source exposes the panel light source light onto the display panel; and a light guide having on its first principal plane multiple projections that optionally release light source light from the tube light source.

The tube light source is stored within the thickness of the light source, a storage section having a light entry surface fabricated within the thickness to guide the light source light from the tube light source into the light guide.

24. A display device wherein the tube light source described in #18 is installed to be adapted within the effective display area of the display panel.

25. A display device comprising, a display panel having a display region made of multiple display pixels, a driving circuitry that drives the display panel, a tube light source, a light guide that includes a light entry surface which is installed near the tube light source and in which the light source light from the tube light source enters, and multiple projections which are installed on the first principal plane of the light guide and which optionally release, from the first principal plane of the light guide, the light source light that propagates within the light guide.

The light guide includes a hard pressed region thinner than the light guide thickness of the light entry surface, the driving circuitry is installed near the hard pressed region.

26. A display device wherein each of the projections described in #1 has a triangular cross section and includes a first exit surface from which the light source light from the tube light source propagating inside the light guide is released outside the light guide and a first reflection surface which either guides to the first exit surface of the light source, or reflects inside the light guide the light source light from the tube light source propagating inside the light guide.

27. A display device wherein the display panel described in #1 and the driving circuitry are electrically connected through a flexible wiring circuit board.

28. A display device wherein the flexible wiring circuit board includes driving ICs.

29. A display device wherein driving ICs are mounted the display panel described in #3.

BRIEF DESCRIPTION OF THE DRAWINGS

A better understanding of the invention may be obtained from the detailed description hereinafter, taken in conjunction with the following drawings.

DESCRIPTION OF THE PREFERRED EMBODIMENTS

Preferred embodiments of the light guide and liquid crystal display device of the present invention are described in detail hereinafter with reference to the figures.

1ST EMBODIMENT

Figure 1:
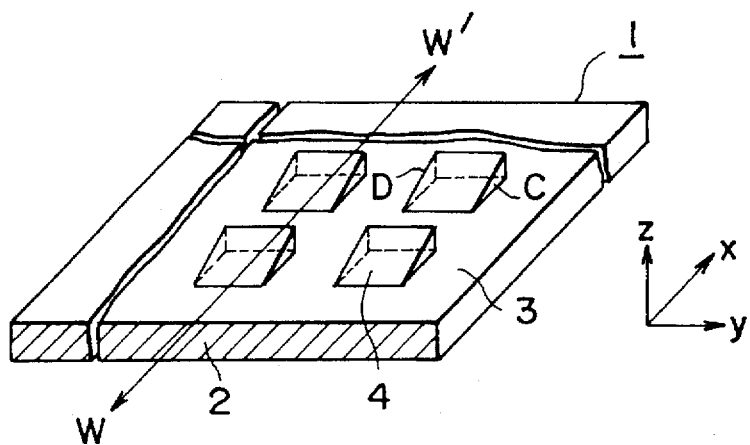
FIG. 1 is a diagram of the light guide of the 1st embodiment.
Figure 2:
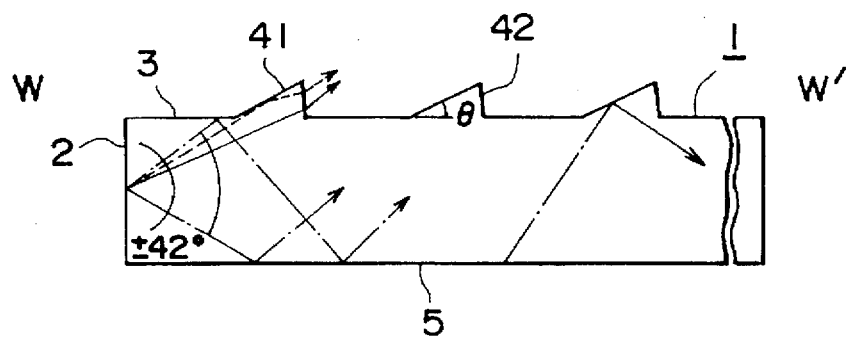
FIG. 2 is a cross section of the light guide of the 1st embodiment.

FIG. 1 is a strabismus diagram of the light guide of this embodiment. FIG. 2 is a cross section along the W-W' line in FIG. 1.

One edge of the light guide 1 of this embodiment shall be called the light entry edge surface 2. A light source using fluorescent lamps (not shown in the diagram), which is almost parallel to this surface, is installed adjacent to this light entry edge surface. Multiple projections 4 are fabricated in a prescribed arrangement, on the light exit principal plane 3, which is the first principal plane of the light guide 1. Here, the term "almost parallel" means "theoretically, completely parallel is desirable but actually, manufacturing error may be allowed". The term "almost" shall hereinafter be used in this sense.

These projections 4 have multiple slopes 41 and 42 which are connected to the light exit principal plane 3 and are made from optically identical materials with the same refractive index as the substrate of the light guide 1. The slope farthest from the light entry edge surface 2, i.e., the light exit surface 42, is fabricated such that it breaks the conditions for total reflection of incident light. On the other hand, the slope nearest the light entry edge surface 2, i.e., the total reflection surface 41, is fabricated such that it fulfills the conditions for total reflection of incident light. Surfaces C and D, which exclude the surfaces 41 and 42 of projection 4, are fabricated such that they are almost parallel to the side of the light guide 1 (i.e., in this embodiment, this refers to a condition wherein they are steep against the light exit principal plane 3). All surfaces other than the projection 4 fabricated part of the light exit principal plane 3 are fabricated such that they totally reflect incident light. This will be explained later.

The substrate of the light guide 1 is normally fabricated of molding acrylic resins; its optical refractive index n is just approximately 1.5. The light which enters the interior of the light guide becomes an element having the following angle distribution in relation to its optical axis:

$$\theta_i \leq \pm \sin^{-1}(1/n)$$

Accordingly, light which enters this light guide 1 becomes a cone with approximately ±42° broadening, as shown in FIG. 2.

From this conical light component, of the light components entering the projection 4, those directly reaching the exit surface 42 (shown in solid line arrows in FIG. 2) are released outside the light guide 1. On the other hand, light components with greater elevation angles (shown by dotted line arrows in FIG. 2), before reaching the exit surface 42, reach the total reflection surface 41. Here, they are reflected, causing their paths to bend, after which they reach the exit surface 42, change angle and are released from the light guide. Light components that do not enter the projection 4 (shown in dashed line in FIG. 2) repeatedly reflect and advance inside the light guide 1 and are eventually released from the exit surface 42 of one of the multiple projections 4.

As a result, light components released from the exit surface 42 become elements having less than the prescribed elevation angle only. This angle becomes smaller than that of the cone of the directional distribution of light source light when it entered light guide 1, thereby increasing the directivity of the emergent light projected from the light guide 1.

The construction of light guide used in the above embodiment is described in detail as follows. The long and short sides of the light entry edge surface 2 are referred to as the y-axis and the z-axis, respectively, while 1 side of the light exit principal plane which crosses the z-axis is called the x-axis. The z-axis component of light with a y-axis component is small compared to the z-axis component of light without a y-axis component. In other words, light with a y-axis component enters at a larger entry angle in relation to the total reflection surface 41 then light without a y-axis component (note that the term "entry angle" as used here refers to the angle formed by the normal of the total reflection surface 41 and the incident light). Accordingly, if at least light without a y-axis component is set to be totally reflected at the total reflection surface 41, light reaching the total reflection surface 41 at an entry angle larger than this component, i.e., light with a y-axis component, will all be totally reflected.

In the light guide of this embodiment, when light source light enters the light guide 1, the cone of the distribution angle of incident light at the light entry edge surface 2 is within ±42°. Hence, light without a y-axis component spreads at a maximum angle of ±42° in the direction of the z-axis, and then propagates. Accordingly, this angle of total reflection surface 41 should be set such that this light is totally reflected.

Here, if the relationship between (a) the angle θ formed by the total reflection surface 41 of a projection and the light exit principal plane 3 of the substrate and (b) the reflective index n of the light guide 1 materials is computed and results in the following equation, incident light is totally reflected from this surface. However, since the amount of emergent light from the light guide depends on the area of the exit surface 42, angle θ should be set according to the required amount of light.

$$0 \leq \theta \leq \sin^{-1}(1/n) = 42°$$

Further, since the cone of the emergent light from the light guide 1 is theoretically best at $\sin^{-1}(1/n)/2$, the directivity of emergent light is maximized. However, in the light guide of this embodiment, the angle θ is set to 25°, and incident light is therefore totally reflected from the total reflection surface 41.

At the same time, since the sides of the light guide 1 (i.e., the remaining two sides facing each other, excepting the following: the light exit principal plane 3 and the other principal plane facing it, and the light exit edge surface and the other edge surface facing it) and the light exit principal plane 3 are directly opposite the light entry edge surface 2, the same condition is fulfilled and incident light is totally reflected from these surfaces.

However, as shown by dots and lines in FIG. 2, the light reflected from the total reflection surface 41 is also reflected from the principal plane opposite the light reflection principal plane 3 and then moves again towards light reflection principal plane 3. However, since the elevation angle is then smaller than that during its entry into the light guide, the conditions for total reflection at the total reflection surface 41 are not broken. Hence, the directivity of the emergent light from the light guide is not disturbed. Furthermore, since the incident light is generally produced as emergent light with directivity, compared to conventional light guides having light diffusing dots or irregular reflection surfaces, the light guide 1 of the present invention has the advantage of minimizing the optical loss inside the light guide. In other words, no light is leaked outside and lost. In addition, since the light guide in this embodiment uses the effect of reflaction and reflection of light, the energy loss during each reflection is reduced such that light source usage efficiency is further improved.

The light guide of this embodiment may be fabricated from acrylic resin plates. However, to totally reflect incident light, it is desirable that the roughness of the surface be made no more than the value derived by dividing the wavelength of the incident light by the reflective index of the light guide. Since the wavelength of the incident light is 400 nm to 700 nm, surface roughness should be no more than 470 nm, or preferably, no more than 270 nm.

2ND EMBODIMENT

Figure 3:
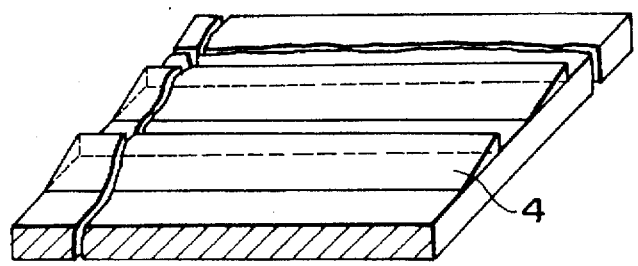
FIG. 3 is a diagram of the light guide of the 2nd embodiment.

FIG. 3 is a diagram of the light guide 1 of this embodiment. As also shown in this diagram, the projections 4 may also be fabricated in the form of an embankment or dike along the y-axis of the light guide 1. In other words, the light guide 1 of the 1st embodiment has projections 4 individually fabricated as separate "islands" but the light guide of this 2nd embodiment has the advantage that it is easily processed by linking the projections along the y-axis. Needless to say, the projections 4 of this form, just like the ones in the 1st embodiment, are effective in arranging angle distribution of emergent light.

3RD EMBODIMENT

Figure 4:
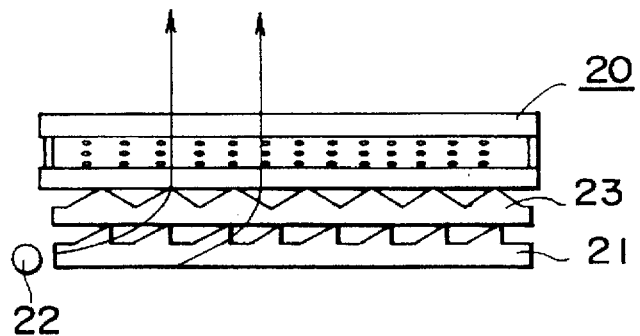
FIG. 4 is a cross section of the liquid crystal display device of the 3rd embodiment.

FIG. 4 is a schematic cross section showing an example of a liquid crystal display device using the light guide 1 of either the 1st or 2nd embodiment.

At the back surface opposite the surface which is the object of observation on a liquid crystal panel 20, a light guide 21 of this embodiment, which is almost parallel to the liquid panel 20, is installed. At the other edge surface of the light guide 21, a linear light source 22 resembling a fluorescent tube is installed parallel to the edge surface. Although not shown in the diagram, it goes without saying that the usage efficiency of the front of the light source light may be improved by installing reflectors with parabolic cross sections such that they are draped over the end of the linear light source 22.

Further, there is an intervening optical element 23 made from prism sheet between the liquid crystal panel 20 and the light guide 21. Owing to the refractive effect of light, this optical element 23 has the ability to bend the optical path of the light released from the light guide 21 such that it is almost perpendicular to the liquid crystal panel 20.

In this type of construction of the liquid crystal display device related to the present invention, since the light from the light source 22, is given directivity by the light guide 21 and then released. It is then outputted to the liquid crystal panel as light taken in through the prism lens sheet 23 and has acquired uniform angle distribution (back light). This reduces the number of light components diagonally crossing the interior of the liquid crystal panel 20. As a result, light released from the light guide 21 crosses the entire surface of the screen of the crystal liquid panel 20 and has an almost uniform optical path length d inside the liquid panel 20; the Δnd (retardation value) becomes uniform, and brightness and contrast which are observed in straight front of the liquid crystal panel 120 is greatly improved.

However, it is desirable that the pitch between the projections of the above-described light guide 21 be less than the pitch between each unit pixels in the liquid crystal panel 20 (e.g., 100 µm); for instance, approximately 10–30 µm would be ideal. This will give the observer a feeling of uniform brightness and achieve fine images with no scattering.

Figure 23:
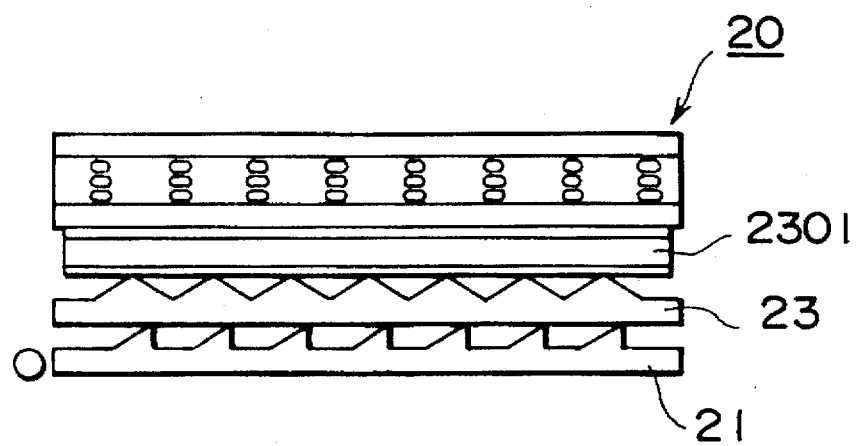
FIG. 23 is a diagram showing another example of using device 2301.

Further, as shown in FIG. 23, between the light guide 21 and the liquid crystal panel 20, element 2301 may also be installed for switching between a mode that transmits and a mode that diffuses the emergent light from the light guide. For instance, high polymer dispersing liquid crystal element may be used for this type of element. By applying to the high polymer dispersing liquid crystal element a voltage which will put the element in a transmitting state, the light outputted from the light guide will enter the liquid crystal panel 20 converged within a fixed angle. On the other hand, when voltage which will put the element in a dispersing state is applied to the high polymer dispersing liquid crystal element, the light outputted from the light guide will be dispersed within the element and then outputted, after which it will enter the liquid crystal panel 20. Utilizing this fact, for instance when brightness or contrast is required in the front direction or when uniform retardation value is desired, the high polymer dispersing liquid crystal element may be set to a transmitting state whereas for conventional use it may be set to a dispersing state, i.e., switching between the two modes according to the purpose of use.

Moreover, if a plastic substrate with polarizing capability is used as one of the substrates that will form the high polymer dispersing liquid crystal and at the same time use it as the polarization plate of the liquid crystal panel 20, it will be possible to make the display device lightweight.

Figure 22:
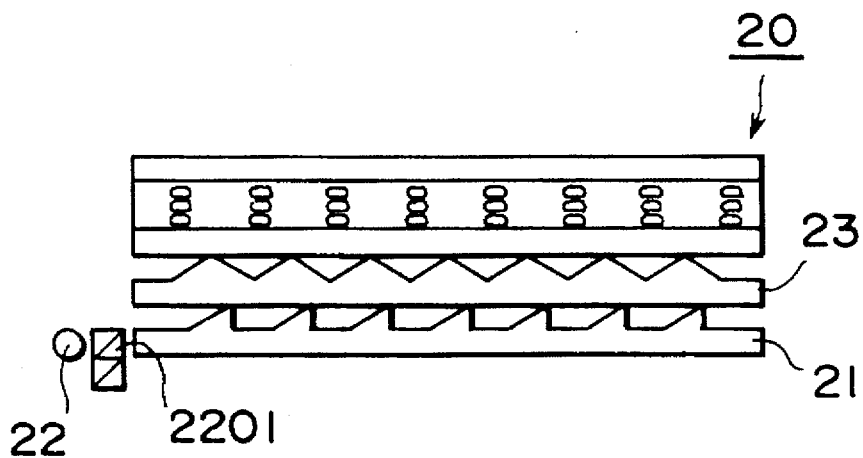
FIG. 22 is a diagram showing another example of using beamspritter 2201.

Further, as shown in FIG. 22, between the light guide 21 and the light source 22, beam splitter 2201 may also be installed as polarizing element. In other words, since the light guide 21 utilizes light refraction and reflection phenomena, the incident light can be released while maintaining its polarized state. Accordingly, light which has been polarized beforehand through the beam splitter 2201 will be outputted from the light guide in a polarized state and enter the liquid crystal panel 20. Thus, it will be possible to reduce the light loss in the polarization plate attached on the external surface of the liquid crystal panel.

4TH EMBODIMENT

Figure 5:
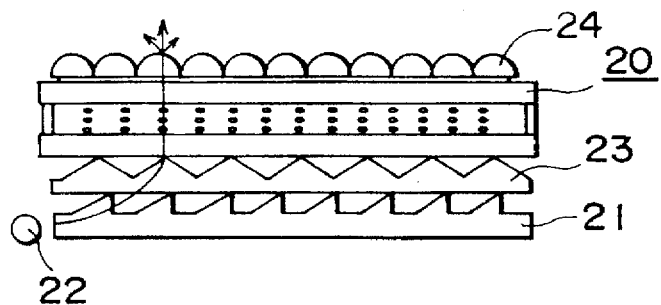
FIG. 5 is a cross section of the liquid crystal display device of the 4th embodiment.

The liquid crystal display device of this embodiment, in addition to the liquid crystal display device of the 3rd embodiment, is characterized by the use of a micro lens unit as an optical element which controls the viewing angle of the liquid crystal display device. As shown in FIG. 5, a micro lens unit 24 is installed in front of the liquid crystal panel 20, in addition to the construction shown in FIG. 4. This makes it possible to diffuse the exit direction of the light that passes the liquid crystal panel 20 and widen the viewing angle of the screen to be observed. Moreover, at this point in time, as in the above embodiments, the light entering the liquid crystal panel 20 has constant directivity, thus greatly improving the display contrast.

The construction shown in FIG. 5, a wider viewing angle may be realized by installing the micro lens unit 24. However, depending on the intended use of the liquid crystal display device, a viewing angle limited to a specific direction may be required (for instance, for head mounted liquid crystal display devices with the optical axis set constant). In this case, a prism lens unit that can refract the emergent light from the liquid crystal panel as optical element 24 may be installed.

5TH EMBODIMENT

In the above embodiments, the projections 4 are installed over the entire surface of the light guide 1 and are of identical shape and uniform density. The following embodiment will describe how uniform emergent light output from a light guide is achieved by changing the shape of the projections.

Figure 6:
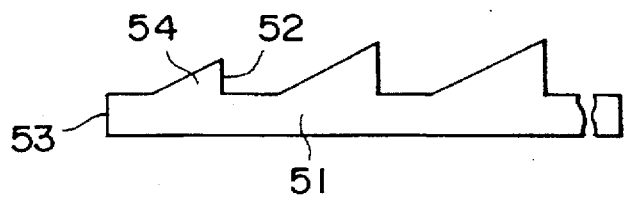
FIG. 6 is a diagram of the light guide of the 5th embodiment.

In the light guide 51 of this embodiment, as shown in FIG. 6, the volume of projections 54 differ according to their distance from the light entry edge surface 53. In other words, the area of the exit surface 52 of the projection 54 which is on the near side of the light entry edge surface 53 is made smallest, and the farther the projection is from the light entry edge surface, the bigger this area is made.

Thus, even if some of the light components entering from the light source are lost inside the light guide 53 according to the distance from light entry edge surface 53, this should be compensated by adjusting the area of the exit surface 52.

6TH EMBODIMENT

In the 5th embodiment, the area of the exit surface 52 is changed. However, projections of identical shapes are installed but their density is changed.

Figure 7:
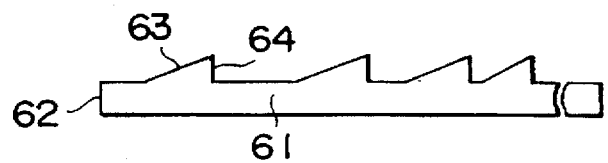
FIG. 7 is a diagram of the light guide of the 6th embodiment.

As shown in FIG. 7, in the light guide 61 of this embodiment, the installation density of the projections 63 on the light entry edge surface side 62 are made smaller, and the farther they are from the light entry edge surface 62, the bigger their density. As a result, the area of the exit surface 64 per unit area of light exit principal plane becomes bigger the farther it is from the light entry edge surface 62, and even if some of the light components entering from the light source are lost according to the distance from light entry edge surface 62, this can be compensated by adjusting the installation density of the projections. Moreover, since the height of the projections is the same as for the light guide 51 of the 5th embodiment shown in FIG. 6, there is the additional advantage of easier mounting of the liquid crystal panel as well as mounting inside the liquid crystal display device.

As described above, these embodiments have the advantage that they provide directivity to the light from a diffused light source while minimizing light loss. It will be appreciated that the present invention may not be limited to the structures disclosed in the above embodiments, but that modifications may be made without departing from the spirit or essential characteristics thereof.

In addition to the constructions described in the above embodiments, an optical system such as a prism lens array for controlling the exit direction of the light source light may be installed between the light entry surface of the light guide and the light source. In other words, this optical system further improves the usage efficiency of the light source light by restricting the broadening of the cone of light components of the light source light when it enters the light guide, or by dividing the cone into upper and lower directions, or by optimizing the advance direction inside the light guide of the incident light from the light source.

Further, since the light guide in the above embodiments utilizes the refractive index of light, unlike conventional light guides using the light scattering system, it has the special ability to release incident light while maintaining the polarizing characteristic of that incident light. Accordingly, when integrating the light guide of the present invention into TN-type liquid crystal display devices which utilize polarization, an optical system with polarizing capability can be installed between the light entry edge surface of the light guide and the light source to provide polarization the moment light source light enters. Accordingly, the polarization plate can be fabricated with a small area the size of the light entry edge surface thereby making it possible to do away with at least one of the large polarization plates pasted on conventional liquid crystal panels.

7TH EMBODIMENT

The liquid crystal display device of the 7th embodiment of the present invention is discussed below with reference to the diagrams.

Figure 8:
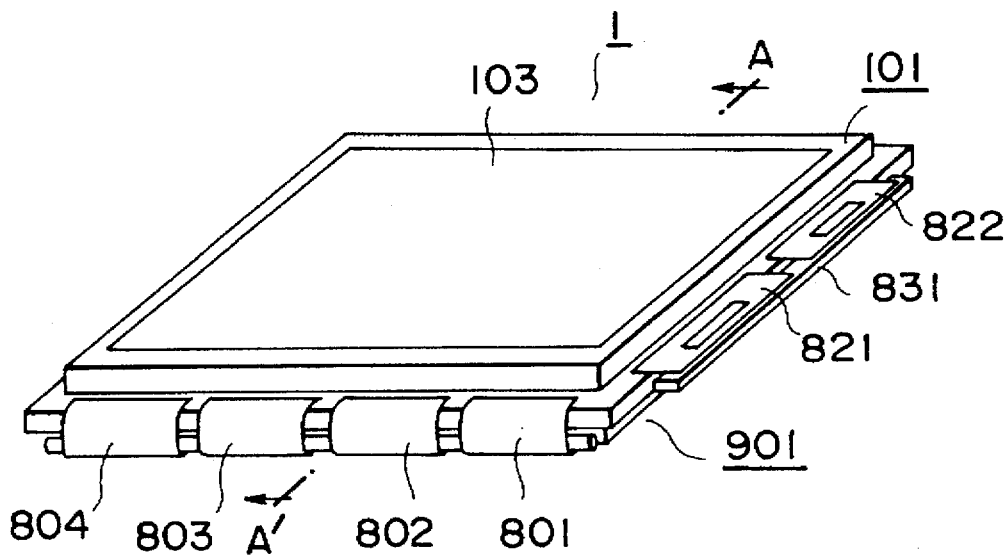
FIG. 8 is a diagram of the liquid crystal display device of the 7th embodiment.
Figure 9:
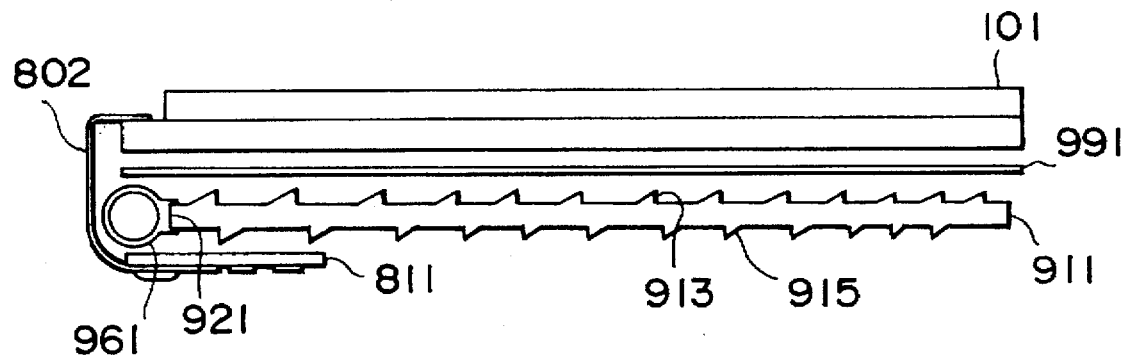
FIG. 9 is a cross section of the liquid crystal display device of the 7th embodiment.

A liquid crystal display device 1 of this embodiment, as shown in FIGS. 8 and 9, includes: a light transmission type liquid crystal panel 101 which normally operates in white mode; four X-TABs 801, 802, 803, and 804 installed on one edge part of the liquid crystal panel 101; two Y-TABs 821 and 822 installed on the other edge part of the liquid crystal panel 101; an X driving circuit board 811 connected to the four X-TABs 801–804; a Y driving circuit board 831 connected to the two Y-TABs 821 and 822; and a panel light source device 901 installed on the back of the liquid crystal panel 101.

To reduce the external dimensions of the liquid crystal display device 1, each of the X-TABs 801–804 is bent at the back of the panel light source device 901 and connected to the X driving circuit board 811 installed on the back of the panel light source device 901.

Figure 11:
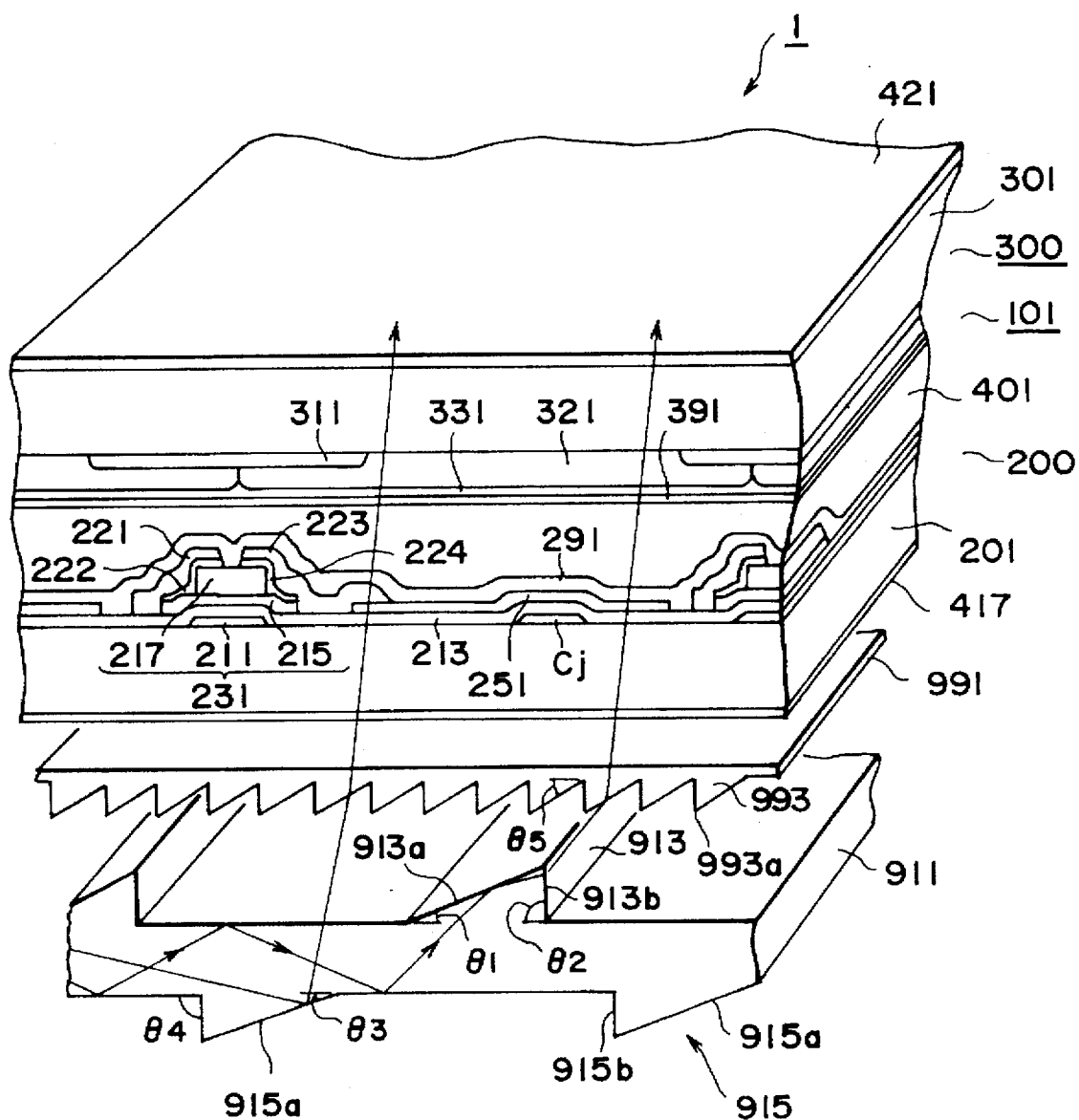
FIG. 11 is another cross section of the liquid crystal display device of the 7th embodiment.

The liquid crystal panel 101 has a 14-inch display region 103 wherein, as shown in FIG. 11, a substrate with the switching matrix 200 and its opposite substrate 300 which are held 5 μm apart are attached with a sealing material (not shown in the diagram); between these gaps, a liquid crystal layer 401 mainly composed of nematic liquid crystal materials having a positive anisotropy of dielectric constant is attached with orientation films 291 and 391 which are aligned orthogonally through a rubbing process.

Figure 10:
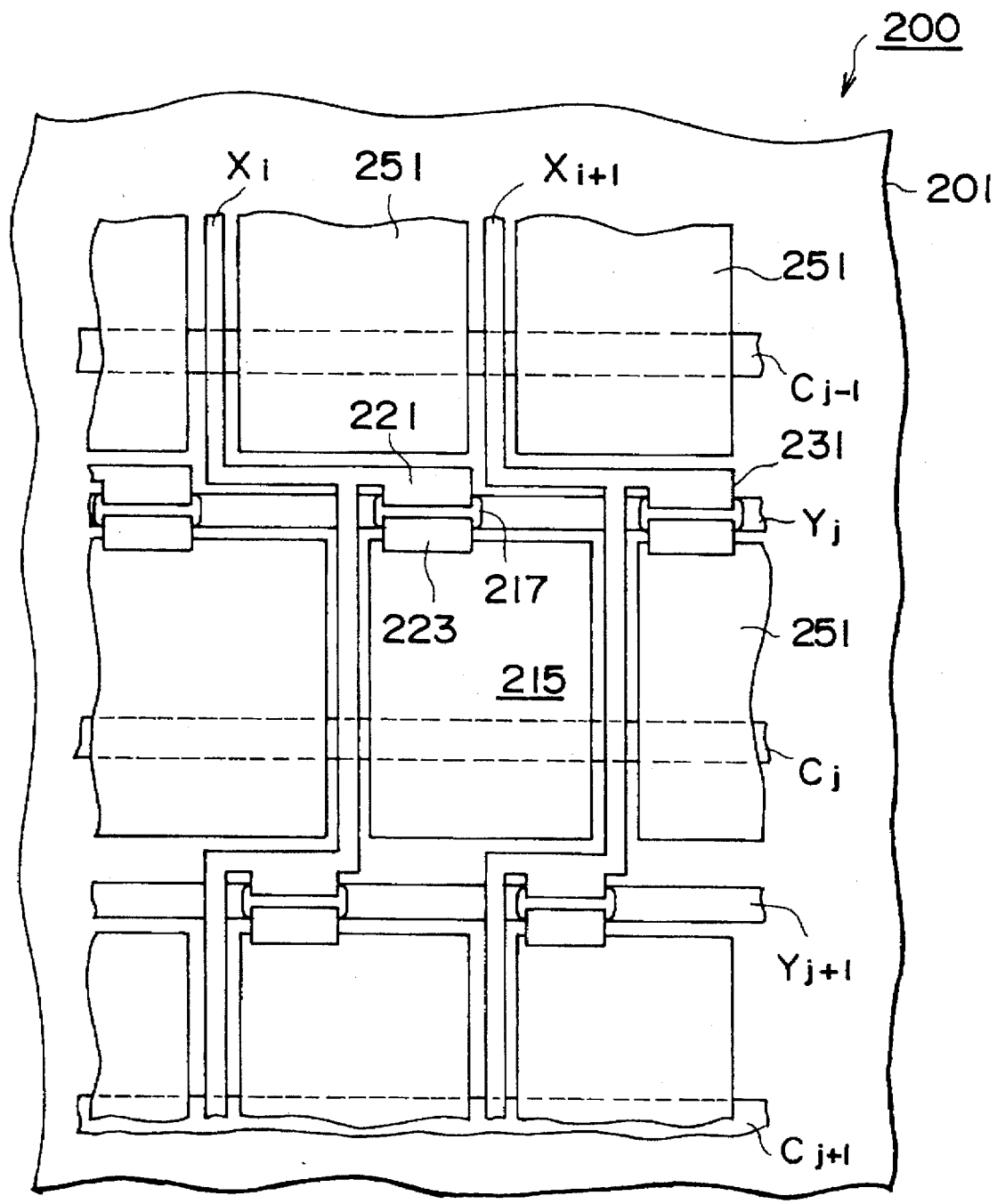
FIG. 10 is a magnified view of the pixel area of the liquid crystal display device of the 7th embodiment.

As shown in FIGS. 10 and 11, the substrate with the switching matrix 200 has a glass substrate 201 on the first principal plane side on which are installed several scanning lines $Y_j$ (j=1, 2, ..., n) and column lines $X_i$ (i=1, 2, ..., m) in a matrix. In a region surrounded by scanning lines $Y_j$ and column lines Xi, there is a transparent pixel diode 261 made of ITO (Indium-Tin-Oxide). Near the intersections of scanning lines Yj and column lines Xi, a thin film transistor (hereinafter referred to as TFT) 231 is installed. This TFT 231 uses the scanning lines Yj themselves as a gate electrode 211 and is comprised of: an insulator film 231 installed above the gate electrode 211; an island-shaped non-crystalloid silicon (a-Si:H) thin film 215 attached with the insulator film; an etching-stopper film on a channel installed above the a-Si:H thin film 215; a drain electrode 221 extending from the column lines Xi and electrically connected to the a-Si:H thin film 215; and a source electrode 223 electrically connected to the pixel diode 251 and the a-Si:H thin film 215. Moreover, between the drain electrode 221 and the source electrode 223 and the a-Si:H thin film 217, n+ type a-Si:H thin films 222 and 224 are installed, each serving as a low resistance semiconductor film and is phosphorous-doped to achieve excellent ohmic contact.

Moreover, storage capacitance lines Cj, which are made of materials identical to those of the scanning lines Yj, and are electrically wired almost parallel to the scanning lines Yj are installed on a glass substrate 201; storage capacitance (Cs) is fabricated from the pixel electrode 251 and storage capacitance lines Cj.

The opposite substrate 300 comprises of: a shielding film 311 installed on top of a glass substrate 301 facing the substrate with the switching matrix 200 to shield the TFT 231 of the substrate with the switching matrix, the gap between column lines Xi and the pixel electrode 251 as well as the gap between scanning lines Yj and the pixel electrode 251; a color filter 321 composed of red (R), green (G), and blue (B) color sections which are installed between shielding films 311; and opposite electrodes 331 made of ITO which are installed above the color filter 321.

Further, polarization plates 411 and 421 are pasted on the outer surface of the substrate with the switching matrix 200 and its opposite substrate 300. Thus, a liquid crystal panel 101 equipped with multiple display pixels is fabricated.

Next is a description of the panel light source device 901. This panel light source device 901, as shown in FIG. 9, is fabricated from acrylic resin and includes: an almost rectangular light guide 911 slightly bigger than the effective display area 103 of the liquid crystal panel 101; a tube light source 951 installed close to one edge surface of the light guide 911 to serve as a light guide surface 921; a reflecting film 961 which efficiently guides the light from a tube light source 951 to the light guide 911; and a prism sheet 991 installed between the light guide 911 and the liquid crystal panel 101.

On the principal plane of the light guide 911, the first projection rows 913 with triangular cross-sections are arranged almost parallel to the light guide surface 921, to optionally control light source light which is guided from the light guide surface 921 and to restrict the broadening of light source light released from the light guide 911. Moreover, on the second principal plane of the light guide 911, the second projection rows 915 with triangular cross-sections are also arranged almost parallel to the light guide surface 921, to optionally release from the principal plane side the light source light guided from the light guide surface 921. However, it must be noted that the first projection rows 913 and second projection rows 915 are arranged reciprocally on the same level, and that the farther a projection row is from the tube light source 951, the denser its pitch arrangement becomes.

As shown in FIG. 11, each of the first projection rows 913 has a reflection surface 913a on the light guide surface 921 side and an exit surface 913b on the edge part side of the light guide 911. Moreover, each second projection row 915 has a reflection surface 915a on the edge part side of the light guide 911.

Because the light guide 911 is made of acrylic resin, light source light entering from the light guide surface 921 of the tube light source 951 enters the light guide 911 at a converging angle $\Omega1$ of approximately 42° perpendicular to the light guide surface 921.

Thus, the angle $\theta1$ formed perpendicular to the light guide surface 921 by the reflection surface 913a of the first projection rows 913 is set at 40°. Moreover, the angle $\theta2$ formed by the exit surfaces 913b and 915b of projection rows 913 and 915, respectively, is set at 90°. Here, the angle $\theta1$ is set at, but is not limited to, 40°; light source light entering from the light guide surface 921, is generally set such that it is guided into the exit surface 913b of projection row 913. However, if the angle $\theta1$ is too small, not many projection rows 913 can be placed and this could cause uneven brightness. It is therefore desirable that this angle be set at 20°–40°.

Further, although the angle $\theta2$ is set here at approximately 90°, to minimize the broadening of the emergent light, it is desirable that this angle be set to not less than 80° and may also be set to an angle exceeding 90°.

With this type of construction, from the exit surface 913b of the first projection rows 913, light source light convering into a 90° broadening angle $\Omega2$ facing an edge part of the light guide 911 will be released.

Further, light source light entering from the light guide surface 921 of the light guide 911 enters the light guide 911 with a converging angle $\Omega1$ of approximately 42° perpendicular to the light guide surface 921. Therefore, the angle $\theta3$ formed perpendicular to the light guide surface 921 by the reflection surface 915a of the second projection rows 915 is set at 20°. Here, the angle $\theta3$ is set at, but is not limited to, 20°; light source light entering from the light guide surface 921 may generally be set such that it is guided into the first principal plane side. However, if the angle $\theta3$ is too small, not many projection rows 915 can be placed and this could cause uneven brightness. It is therefore desirable that this angle be set at 10°–25°.

Further, it is desirable that the other surface 915b of the second projection row 915 be fabricated such that light source light propagated inside the light guide 911 is not reflected. Accordingly, although angle $\theta4$ is set to approximately 90°, it is recommended that this angle not exceed 132°.

With this type of construction, light source light reflected from the reflection surface of the second projection row 915 is released from the first principal plane of the light guide 911.

The prism sheet 991 installed between the liquid crystal panel 101 and the light guide 911 includes multiple projection rows 993 which protrude to face the light guide 911 side and are arranged almost parallel to projection rows 913 of the light guide 911. These projection rows 993 have a refracting surface 993a which guides the emergent light from the light guide 911 to the liquid crystal panel 101 side and the angle $\theta5$ formed between the principal plane of the prism sheet 991 and the refracting surface 993a is set at approximately 40°.

Thus, light source light released towards the top or edge part of the light guide 911 is controlled as light source light facing the liquid crystal panel 101 side.

With this construction, the liquid crystal display device of this embodiment operates as follows.

Light source light components entering the light guide surface 921 from the tube light source 951 propagates inside the light guide while some are released from the exit surface 913b of the first projection row 913. Similarly, some of the light source light components propagating inside the light guide 911 are reflected from the reflection surface 915a of the second projection row 915 and are then released from the first principal plane side of the light guide 911.

The emergent light released from the light guide 911 in this manner is controlled by a panel light source light converged by the prism sheet 991 towards the liquid crystal panel 101.

Thus, according to the liquid crystal display device of this embodiment, due not only to the first projection rows integrated with the light guide on the first principal plane of the light guide but also to the second projection rows integrated with the light on the second principal plane of the light guide, light source light released from the light guide towards the liquid crystal panel is converted to panel light source light facing the liquid crystal panel side. Therefore, even if the formation pitch of each projection is restricted, uniform panel light source light, and hence excellent display image of even brightness, are achieved.

In this embodiment, projection rows are installed on the second principal plane of the liquid crystal panel and light source light is guided to the first principal plane side. However, a groove with triangular cross-section having a reflection surface on the tube light source side will also do. Moreover, on the second principal plane side of the light guide, a reflective film may be installed, or metallic materials may be attached to improve the reflecting ability.

Further, a light guide made of acrylic resin is used in this embodiment, but other materials may also do. When other materials are used, because the solid angle of light source light entering from the light guide surface slightly differs, with the above-described situations in mind, the angle formed by each projection or groove must be modified accordingly.

Moreover, in this embodiment, one edge surface of the light guide was used as a light guide surface and a tube light source is installed close to this edge surface. However, a tube light source may also be installed by constructing grooves on a light guide equivalent to the display region. The external dimensions of the panel light source device in relation to the display area can thus be minimized and hence, a picture-frame-sized display device is realized.

According to the panel light source device of this invention, high usage efficiency without losing productivity and minimization of in-surface scattering of display brightness are achieved. Moreover, according to the display device using this panel light source device, it is possible to realize excellent, even display images.

8TH EMBODIMENT

The active matrix type liquid crystal display device of the 8th embodiment of the present invention is discussed below with reference to the diagrams. Note that parts identical to those in the above embodiments are described herein using the same reference numerals as those in FIGS. 1–11.

Figure 12:
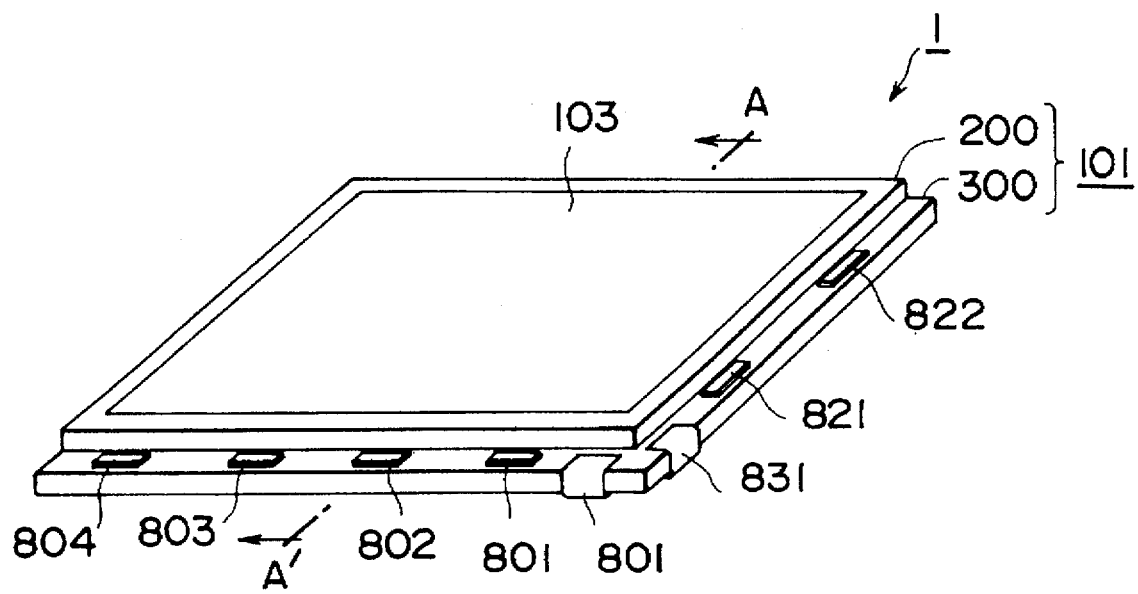
FIG. 12 is a diagram of the liquid crystal display device of the 8th embodiment.
Figure 13:
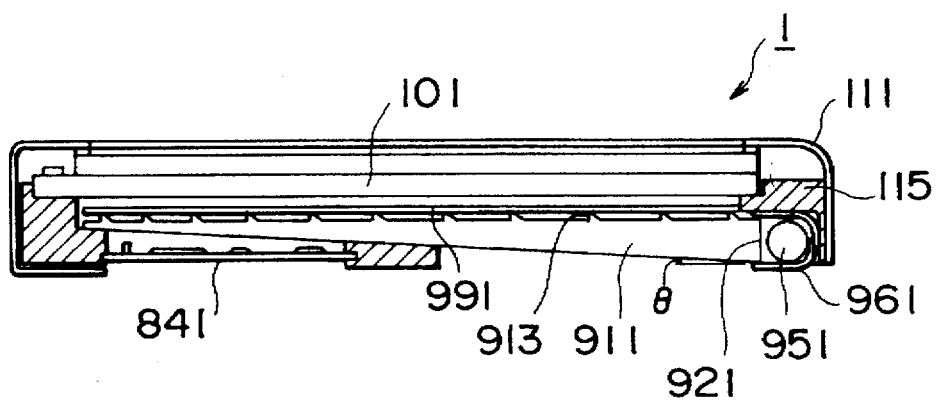
FIG. 13 is a cross section of the liquid crystal display device of the 8th embodiment.

The liquid crystal display device of this embodiment, as shown in FIGS. 12 and 13, includes: a light transmission type liquid crystal panel 101 which operates normally in white mode; four column line driving ICs 801, 802, 803, and 804 mounted along one edge part of the liquid crystal panel 101 and which output serial image data converted to parallel image data through direct parallel conversion as analog image data; two scanning line driving ICs 821 and 822 mounted along the other edge part of the liquid crystal panel 101 and which output consecutive scanning pulses; a driving circuit board 841 which is installed at the back of the liquid crystal panel and which output serial image data and control signals to the four column line driving ICs 801, 802, 803, and 804 as well as output start signals and control signals to the two scanning line driving ICs 821 and 822 (see FIG. 13); a flexible printed circuit board (FPC) 811 which connects the driving circuit board 841 and the four column line driving ICs 801, 802, 803, and 804; a flexible printed circuit board (FPC) 831 to connect the driving circuit board 841 and the two scanning line driving ICs 821 and 822; and a panel light source device installed at the back of the liquid crystal panel 101.

Further, as shown in FIG. 13, the panel light source device 901 is held by an acrylic resin frame 115; the driving circuit board 841 is also held by the frame 115 at the back of the panel light source device. Moreover, this frame 115 and a metallic vessel 111 have an opening which exposes the display region 103, and they clip the liquid crystal panel in place.

Figure 15:
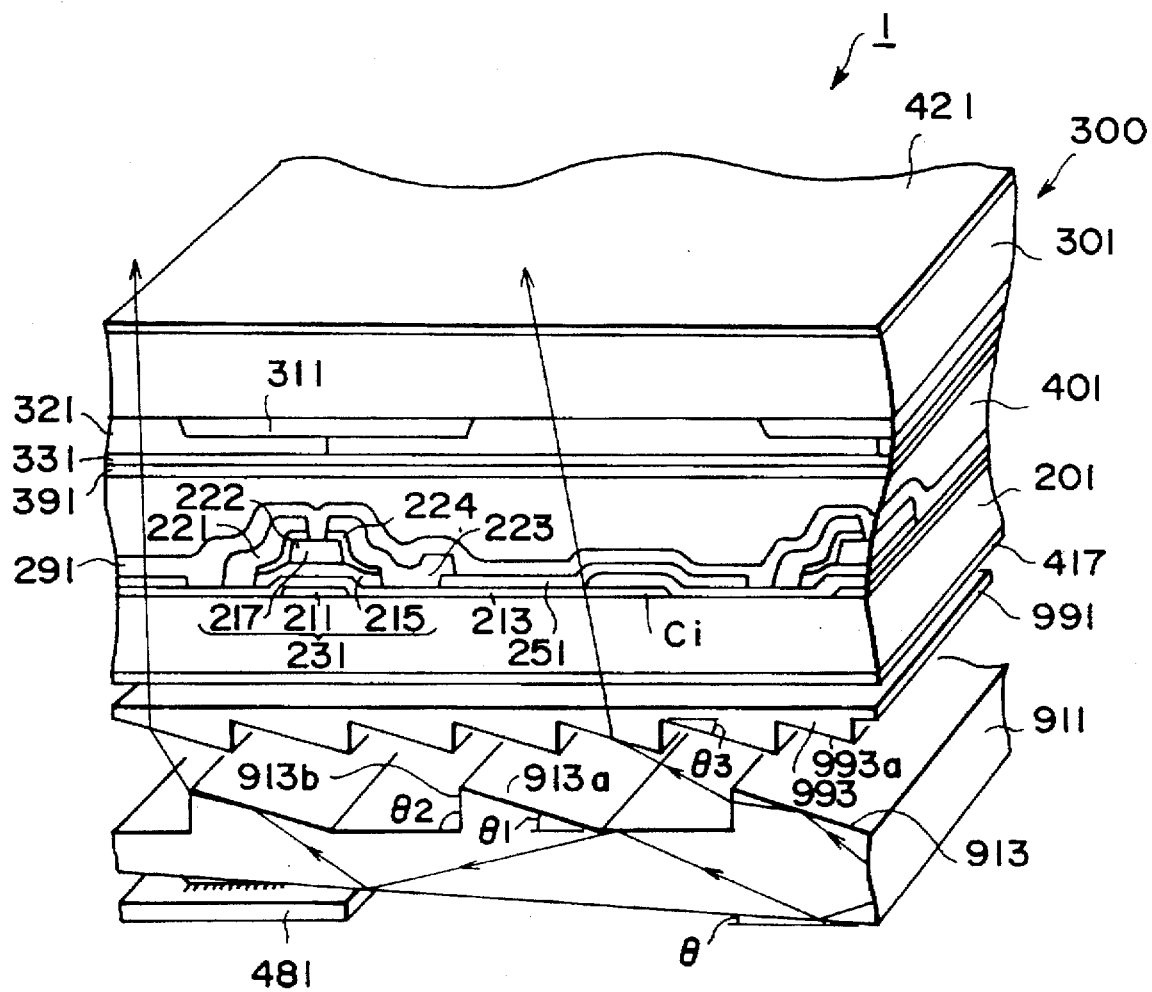
FIG. 15 is another cross section of the liquid crystal display device of the 8th embodiment.

The liquid crystal panel 101 has a 14-inch display region 103 as shown in FIG. 12. In particular, as shown in FIG. 15, a substrate with the switching matrix 200 and its opposite substrate 300 which are held 5 μm aprt, are attached with a sealing material (not shown in the diagram). Between this gap, a liquid crystal layer 401 mainly composed of nematic liquid crystal materials having a positive anisotropy of dielectric constant is attached with orientation films 291 and 391, which are aligned orthogonally through a rubbing process.

Figure 14:
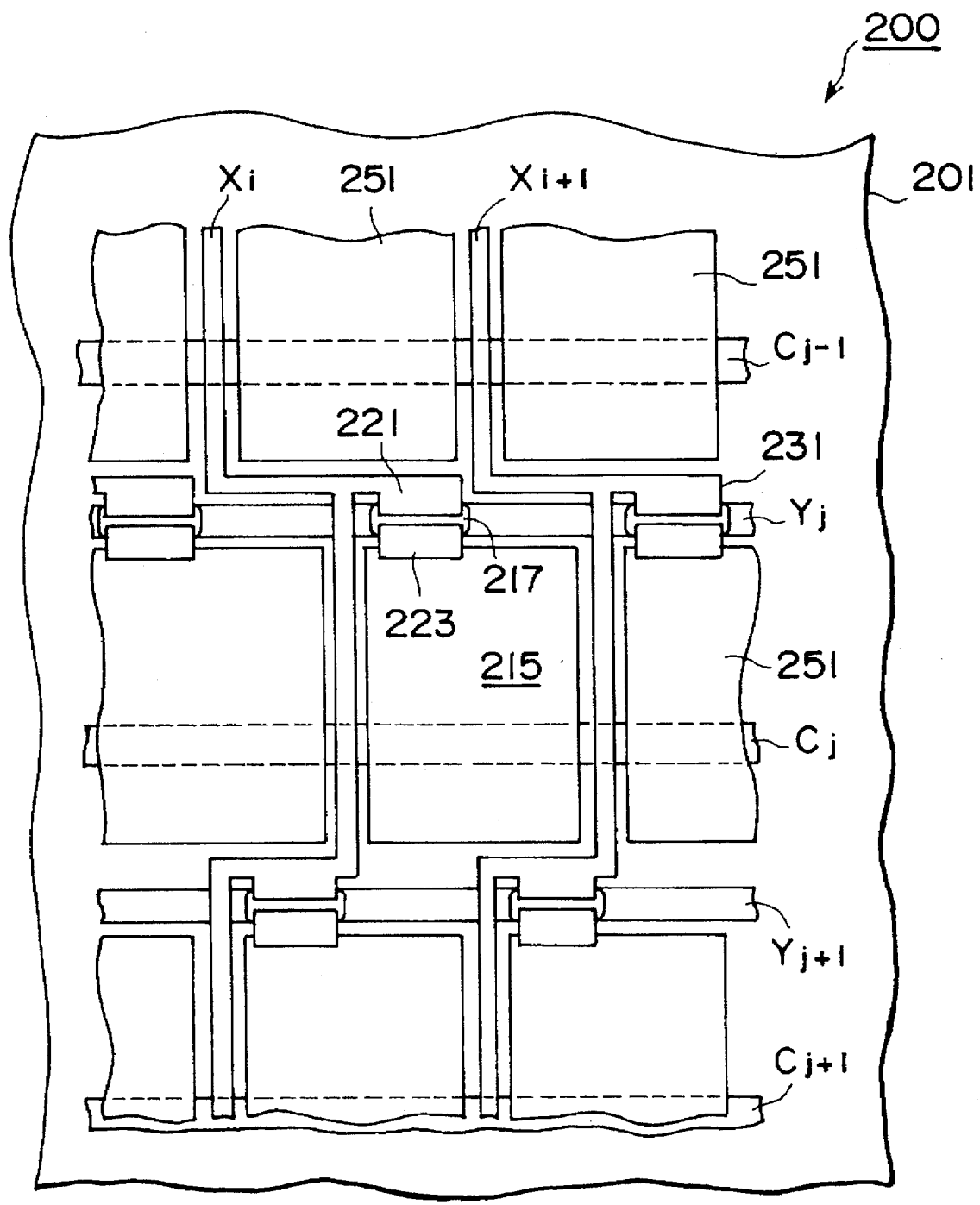
FIG. 14 is a magnified view of the pixel area of the liquid crystal display device of the 8th embodiment.

As shown in FIGS. 14 and 15, the substrate with the switching matrix 200 has a glass substrate 201 on whose first principal plane side are installed several scanning lines Yj (j=1, 2, . . . , n) and column lines Xi (i=1, 2, . . . , m) in a matrix. In a region surrounded by scanning lines Yj and column lines Xi, there is a transparent pixel diode 261 made of ITO (Indium-Tin-Oxide). Near the intersections of scanning lines Yj and column lines Xi, a thin film transistor (hereinafter referred to as TFT) 231 is installed. This TFT 231 uses the scanning lines Yj themselves as gate electrode 211 and is comprised of: an insulator film 231 installed above the gate electrode 211; an island-shaped non-crystalloid silicon (a-Si:H) thin film 215 installed via the insulator film; an etching-stopper film on the channel installed above the a-Si:H thin film 215; a drain electrode 221 which extends from the column lines Xi and is electrically connected to the a-Si:H thin film 215; and a source electrode 223 electrically connected to the pixel diode 251 and the a-Si:H thin film 215. Moreover, between the drain electrode 221, the source electrode 223 and the a-Si:H thin film 217, n+ type a-Si:H thin films 222 and 224 are installed, each serving as a low resistance semiconductor film and phosphorous-doped to achieve excellent ohmic contact.

Moreover, storage capacitance lines Cj, which are made of materials identical to those of the scanning lines Yj, and are electrically wired almost parallel to the scanning lines Yj, are installed on a glass substrate 201. Storage capacitance (Cs) is fabricated from the pixel electrode 251 and storage capacitance lines Cj.

The opposite substrate 300 comprises: a shielding film 311 installed on top of a glass substrate 301 facing the substrate with the switching matrix 200 to shield the TFT 231 of the substrate with the switching matrix, the gap between column lines Xi and pixel electrode 251 as well as the gap between scanning lines Yj and pixel electrode 251; a color filter 321 composed of red (R), green (G), and blue (B) color sections which is installed between shielding films 311; and opposite electrodes 331 made of ITO, which are installed above the color filter 321.

Further, polarization plates 411 and 421 are pasted, on the outer surface of the substrate with the switching matrix 200 and its opposite substrate 300. Thus, a liquid crystal panel 101 equipped with multiple display pixels is fabricated.

Next is a description of the panel light source device 901. This panel light source device 901, as shown in FIG. 9, is fabricated from acrylic resin and includes: an almost rectangular light guide 911 slightly bigger than the effective display area 103 of the liquid crystal panel 101; a tube light source 951 installed close to one edge surface of the light guide 911 to serve as a light guide surface 921; and a reflecting film 961 which efficiently guides the light from a tube light source 951 to the light guide 911; and a prism sheet 991 installed between the light guide 911 and the liquid crystal panel 101.

The light guide 911 is fabricated such that its thickness continuously decreases with distance from the light guide surface. More particularly, perpendicular to the light guide surface 921, the angle θ formed by the back side principal plane of the light guide 911 is set to approximately 0.5°.

Further, on the principal plane of the light guide 911, the first projection rows 913 with triangular cross-sections are arranged almost parallel to the light guide surface 921, to optionally control light source light which is guided from the light guide surface 921 and to restrict the broadening of light source light released from the light guide 911. However, it must be noted that the first projection rows 913 are arranged reciprocally on the same level, and that the farther a projection row is from the tube light source 951, the denser its pitch arrangement becomes. Moreover, as shown in FIG. 15, each of the first projection rows 913 has a reflection surface 913a on the light guide surface 921 side and an exit surface 913b on the edge part side of the light guide 911.

Incidentally, because the light guide 911 is made of acrylic resin, light source light entering from the light guide surface 921 of the tube light source 951 enters the light guide 911 with a converging angle Ω1 of approximately 42° perpendicular to the light guide surface 921.

Thus, the angle θ1 formed perpendicular to the light guide surface 921 by the reflection surface 913a of the first projection rows 913 is set at 40°. Moreover, the angle θ2 formed by the exit surfaces 913b and 915b of projection rows 913 and 915, respectively, is set at 90°. Here, the angle θ1 is set at, but is not limited to, 40°. Light source light entering from the light guide surface 921 may be set generally such that it is guided into the exit surface 913b of the projection rows 913. However, if the angle θ1 is too small, not many projection rows 913 can be placed and this may cause uneven brightness. It is therefore desirable that this angle be set between 20°–40°.

As particularly described in this embodiment, since the principal plane at the back of the light guide 911 is fabricated such that it forms an angle θ with the light guide surface 921, this angle θ1 can be set bigger, allowing the arrangement pitch of the projection rows 913 to be set closer and thereby reducing in-surface scattering of brightness.

Further, although the angle θ2 is set here at approximately 90°, to minimize the broadening of the emergent light, it is desirable that this angle be set to not less than 80° and it may also be set to an angle exceeding 90°. With this type of construction, from the exit surface 913b of the first projection rows 913, light source light converged into a 90° broadening angle θ2 facing an edge part of the light guide 911 is released.

The prism sheet 991 installed between the liquid crystal panel 101 and the light guide 911 includes multiple projection rows 993, which protrude to face the light guide 911 side and are arranged almost parallel to projection rows 913 of the light guide 911. These projection rows 993 have a refracting surface 993a which guides the emergent light from the light guide 911 to the liquid crystal panel 101 side, and the angle θ3 formed between principal plane of the prism sheet 991 and the refracting surface 993a is set at approximately 30°.

Thus, light source light released toward the edge part of the light guide 911 is controlled as light source light facing the liquid crystal panel 101 side.

With this construction, this liquid crystal display device operates as follows.

Light source light entering the light guide surface 921 from the tube light source 951 propagates inside the light guide while some is released from the exit surface 913b of the projection row 913. The emergent light released from the light guide 911 is then controlled as uniform panel light source light converges to face the liquid crystal panel 101 through the prism sheet 991.

From the above description, according to the liquid crystal display device of this embodiment, since the light source light released from the light guide toward the liquid crystal panel is converted to panel light source light heading towards the liquid crystal panel through the projection rows integrated with the light guide on the first principal plane of the light guide, high usage efficiency of the light source light, and hence high contrast, are achieved. If a conventional level of contrast is sufficient, the power consumption of the tube light source can be reduced. In addition, since this type of light guide can be fabricated as a single unit, its cost can be lowered.

Moreover, in this embodiment, since the back surface side principal plane of the light guide is fabricated with a prescribed angle with the light guide surface and to be continuously hard pressed, the projection row pitch can be set closer, thereby making it possible to reduce in-surface scattering of brightness.

Further, in this embodiment, since the driving circuit board is stored on the back surface side of the light guide, particularly on the hard pressed portion of the light guide, a picture-frame-sized liquid crystal display device can be realized without assetting its thickness.

In this embodiment, no particular treatment is given to the back surface side of the light guide, but for instance, by lining up projections or grooves and controlling by releasing some of the light source light propagated within the light guide from the first principal plane side, scattering of in-surface brightness can be further reduced.

Incidentally, a light guide made of acrylic resin is used in this embodiment, but other materials may also do. If other materials are used, because the solid angle of light source light entering from the light guide surface will differ slightly, with the above-described situations in mind, the angle formed by each projection or groove must be modified accordingly.

Further, in this embodiment, since the converging angle of the light source light released from the panel light source device is made small, installing a scattering film on the observer side of the liquid crystal panel will improve the viewing angle of the display device and will be suitable for observers when displaying at various angles.

Moreover, in this embodiment, picture frame sizing was achieved by drawing column lines on only one edge side and scanning lines on only the other edge side of the substrate with the switching matrix, mounting the driving circuit IC on the substrate to the switching matrix, and electrically connecting the substrate with the driving circuit board through the FPC. However, the substrate with the switching matrix and the driving circuit board may also be electrically connected through TAB-ICs in which driving ICs are mounted on a flexible printed circuit board.

In addition, in this embodiment, one edge surface of the light guide is used as the light guide surface, but the tube light source may also be arranged by installing grooves or through-holes with a light guide surface on the light guide.

According to the display device of this invention, since a panel light source device with high usage efficiency of light source light in addition to excellent productivity is provided, a display device of low cost, high contrast, and low power consumption is achieved.

Moreover, according to this invention, a picture-frame-sized display device is realized without drastically changing its thickness.

9TH EMBODIMENT

The liquid crystal display device of the 9th embodiment of the present invention is discussed below with reference to the diagrams.

Figure 16:
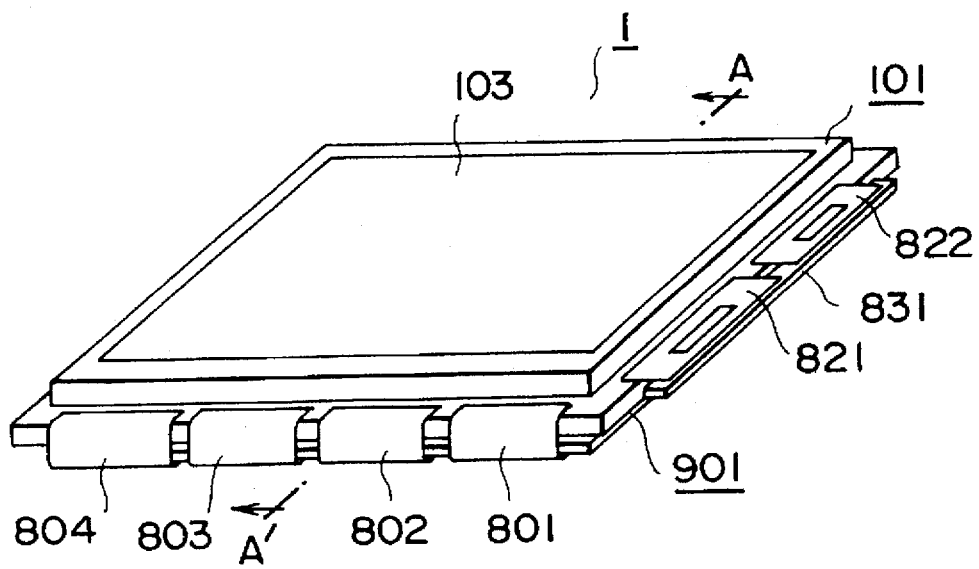
FIG. 16 is a diagram of the liquid crystal display device of the 9th embodiment.
Figure 17:
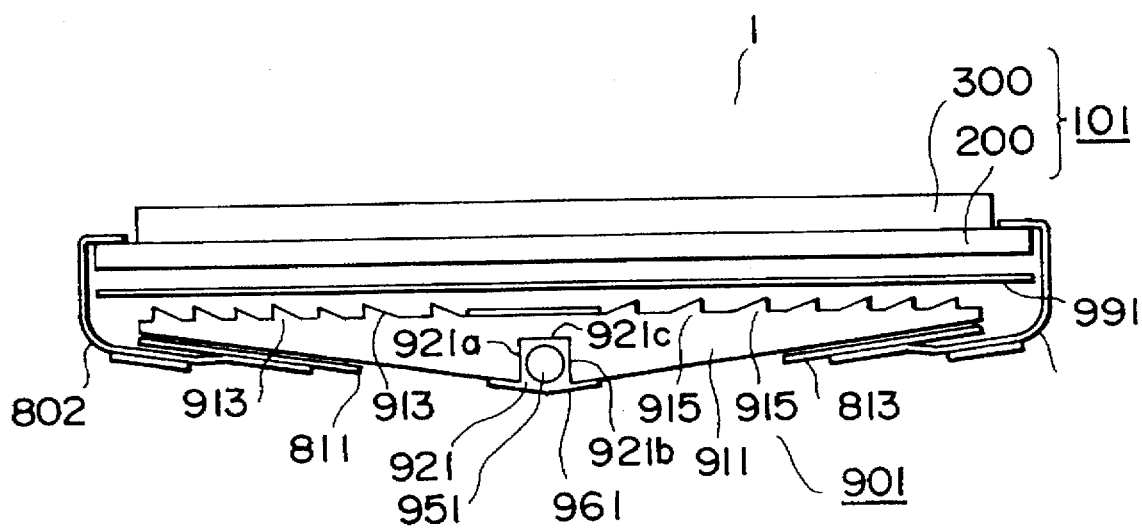
FIG. 17 is a cross section of the liquid crystal display device of the 9th embodiment.

The liquid crystal display device 1 of this embodiment, as shown in FIGS. 16 and 17, includes: a light transmission type liquid crystal panel 101 which normally operates in white mode; four X-TABs 801, 802, 803, and 804 installed on one edge part of the liquid crystal panel 101; four X-TABs 806 installed on the opposite edge part of the liquid crystal panel 101; two Y-TABs 821 and 822 installed on the other edge part of the liquid crystal panel 101; an X driving circuit board 811 connected to the four X-TABs 801–804; an X driving circuit board 813 connected to the four X-TABs 806; a Y driving circuit board 831 connected to the two Y-TABs 821 and 822; and a panel light source device 901 installed on the back of the liquid crystal panel 101.

To reduce the external dimensions of the liquid crystal display device 1, each of the X-TABs 801–804 is bent at the back of the panel light source device 901 and connected to the X driving circuit board 811 which is installed on the back of the panel light source device 901.

The liquid crystal panel 101 has a 14-inch display region 103 wherein, as shown in FIG. 11, a substrate with the switching matrix 200 and its opposite substrate 300 which are held 5 µm apart are attached with a sealing material (not shown in the diagram); between these gaps, a liquid crystal layer 401 mainly composed of nematic liquid crystal materials having a positive anisotropy of dielectric constant is attached with orientation films 291 and 391 which are aligned orthogonally through a rubbing process.

Figure 18:
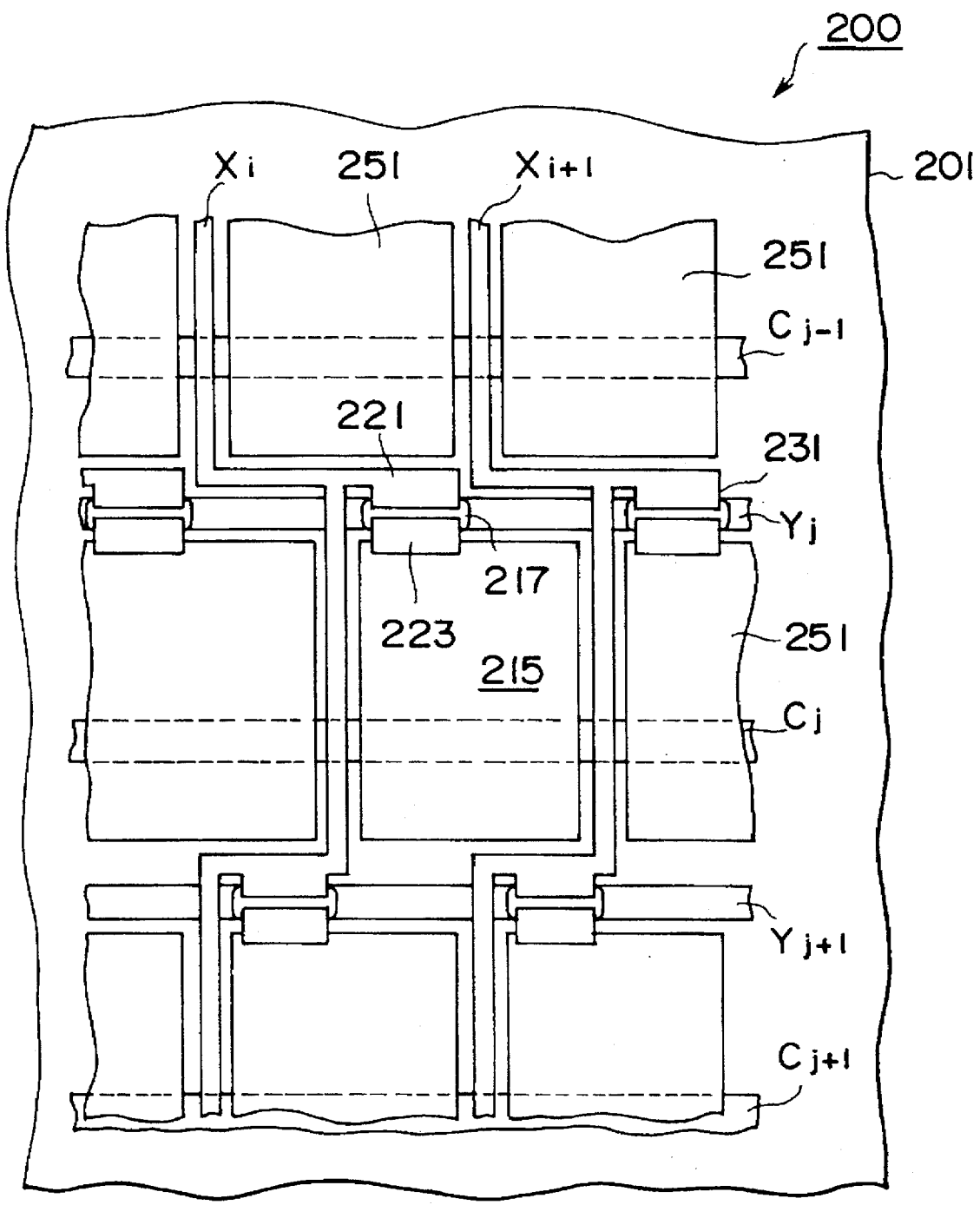
FIG. 18 is a magnified view of the pixel area of the liquid crystal display device of the 9th embodiment.
Figure 19:
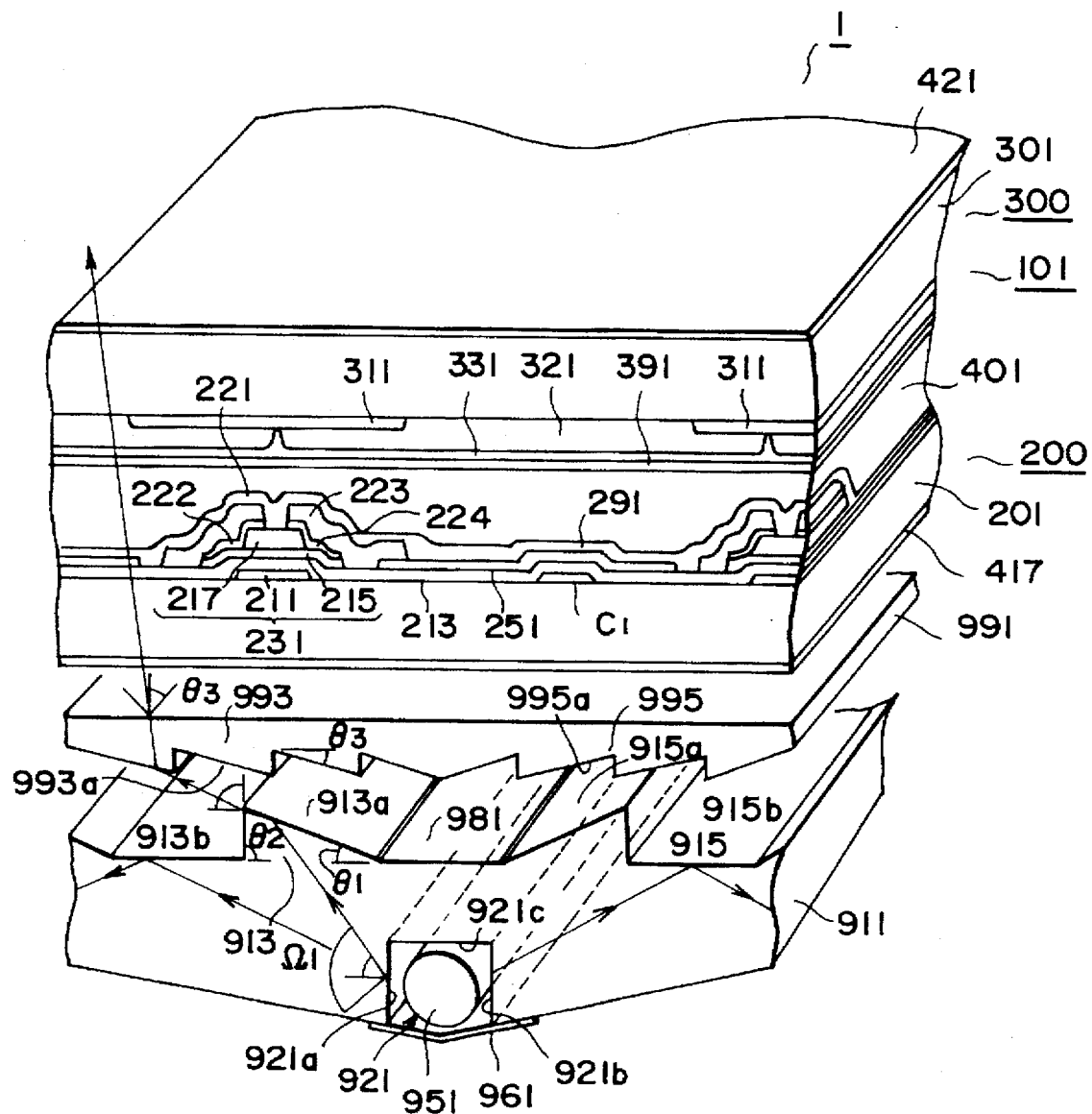
FIG. 19 is another cross section of the liquid crystal display device of the 9th embodiment.

As shown in FIGS. 18 and 19, the substrate with the switching matrix 200 has a glass substrate 201 on whose first principal plane side are installed several scanning lines Yj (j=1, 2, ..., n) and column lines Xi (i=1, 2, ..., m) in a matrix. In a region surrounded by scanning lines Yj and column lines Xi, there is a transparent pixel diode 261 made of ITO (Indium-Tin-Oxide). A thin film transistor (hereinafter referred to as TFT) 231 is installed near the intersections of scanning lines Yj and column lines Xi. This TFT 231 uses the scanning lines Yj themselves as a gate electrode 211 and is comprised of: an insulator film 231 installed above the gate electrode 211; an island-shaped non-crystalloid silicon (a-Si:H) thin film 215 installed via the insulator film; an etching-stopper film on a channel installed above the a-Si:H thin film 215; a drain electrode 221 which extends from the column lines Xi and is electrically connected to the a-Si:H thin film 215; and a source electrode 223 electrically connected to the pixel diode 251 and the a-Si:H thin film 215. Moreover, between the drain electrode 221 and the source electrode 223 and the a-Si:H thin film 217, n+ type a-Si:H thin films 222 and 224 are installed, each serving as a low resistance semiconductor film and phosphorous-doped to achieve excellent ohmic contact.

Moreover, storage capacitance lines Cj, which are made of materials identical to those of the scanning lines Yj, and are electrically wired almost parallel to the scanning lines Yj are installed on a glass substrate 201. Storage capacitance (Cs) is fabricated from the pixel electrode 251 and storage capacitance lines Cj.

The opposite substrate 300 comprises: a shielding film 311 installed on top of a glass substrate 301 facing the substrate with the switching matrix 200 to shield the TFT 231 of the substrate with the switching matrix, the gap between column lines Xi and pixel electrode 251 as well as the gap between the scanning lines Yj and the pixel electrode 251; a color filter 321 composed of red (R), green (G), and blue (B) color sections which is installed between shielding films 311; and opposite electrodes 331 made of ITO, which are installed above the color filter 321.

Further, polarization plates 411 and 421 are pasted on the outer surface of the substrate with the switching matrix 200 and its opposite substrate 300. Thus, a liquid crystal panel 101 equipped with multiple display pixels is fabricated.

Next is a description of the panel light source device 901. This panel light source device 901, as shown in FIG. 2, is made from acrylic resin and includes: an almost rectangular light guide 911 slightly bigger than the effective display area 103 of the liquid crystal panel 101; a tube light source 951 installed in the lamp storage groove 921 of the light guide 911; a reflecting film 961 covering the lamp storage groove 921; and a prism sheet 991 installed between the light guide 911 and the liquid crystal panel 101.

The light guide 911 has a lamp storage groove 921 fabricated parallel to the long side of the light guide 911, in the region corresponding to the effective display area of the liquid crystal panel, i.e., at the center of the back surface. The tube light source 951 is stored in this lamp storage groove 951. The board thickness is tapered such that it becomes thinner from the lamp storage groove 921 towards the light guide 911 edge.

Figure 20:
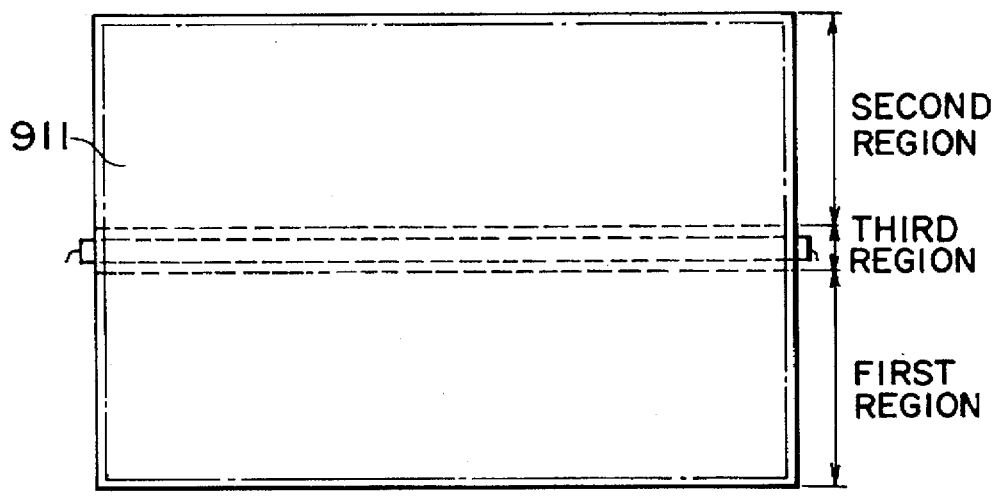
FIG. 20 is a diagram showing the relationship between the light guide and light source described in the 9th embodiment with regard to their leveled position.

Moreover, as shown in FIG. 20, a region corresponding to the lamp storage groove in the light guide 911 is functionally divided into a third region, and first and second regions that sandwich this third region.

This lamp storage groove 921 includes: the first light guide plane 921a fabricated perpendicular to the light guide 911 to guide the light source light from the tube light source 951 into the first region of the light guide 911; the second light guide plane 921b fabricated perpendicular to the light guide 911 to guide the light source light into the second region of the light guide 911; and the third light guide plane 921c fabricated perpendicular to the light guide 911 to guide the light source light into the third region of the light guide 911.

On the first region on the principal plane of the light guide 911, to optionally control light source light which is guided from the light guide surface 921 and to restrict the broadening of light source light released from the light guide 911, the first projection rows 913 with triangular cross-sections are arranged almost parallel to the first light guide surface 921a. Moreover, in the second region on the principal plane of the light guide 911, the second projection rows 915 with triangular cross-sections are also arranged almost parallel to the second light guide surface 921b to optionally control light source light which is guided from the light guide surface 921 and to restrict the broadening of light source light released from the light guide 911. However, it must be noted that the first projection rows 913 and the second projection rows 915 are arranged reciprocally on the same level, and that the farther a projection row is from the tube light source 951, the denser its gap becomes, thereby securing uniform display brightness.

As shown in FIG. 19, each of the first projection rows 913 has a reflection surface 913a on the first light guide surface 921a side and an exit surface 913b on the edge part side of the light guide 911. Similarly, each second projection row 915 has a reflection surface 915a on the second light guide surface 921b and an exit surface 916b on the edge part side of the light guide 911. In other words, the light guide 911 is symmetrical to the first and second regions via the third region.

The light source light entering from the tube light source 951 via the first light guide plane side 921a and the second light guide plane side 921b, because the light guide 911 is made of acrylic resin, enters in with a converging angle $\Omega 1$ of approximately 42° perpendicular to the first light guide plane 921a and second light guide plane 921b, respectively.

Thus, the angle $\theta 1$ formed perpendicular to the first light guide plane 921a and the second light guide plane 921b by the reflection surfaces 913a and 915a of the projection rows 913 and 915 is set at 40°. Moreover, the angle $\theta 2$ formed by the exit surfaces 913b and 915b of the projection rows 913 and 915, respectively, is set at 90°. Here, the angle $\theta 1$ is set at, but is not limited to, 40°. Light source light entering from the first and second light guide surfaces 921a and 921b may generally be set such that it is guided into the exit surface 913b and 915b of the projection rows 913 and 915. However, if the angle $\theta 1$ is too small, not many projection rows 913 and 915 can be placed and this may cause uneven brightness. It is therefore desirable that this angle be set between 20°–40°. Particularly in this embodiment, because the board thickness is tapered such that it becomes thinner from the lamp storage 921 towards the light guide 911 edge, the angle $\theta 1$ formed with the reflection surfaces 913a and 915a of the projection rows 913 and 915, respectively, may be set, for instance, to more than 42° so that uneven brightness is better controlled.

Further, although the angle $\theta 2$ was set here at approximately 90°, to minimize the broadening of the emergent light, it is desirable that this angle be set at not less than 80° and may also be set to an angle exceeding 90°.

With this type of construction, from the exit surface 913b of the first projection rows 913, light source light converged into a 90° broadening angle $\Omega 2$ facing an edge part of the light guide 911 will be released. Similarly, light source light converged into a 90° broadening angle $\Omega 2$ facing the other edge part of the light guide 911 is also released from the exit surface 915b of the second projection rows 915.

The prism sheet 991 installed between the liquid crystal panel 101 and the light guide 911 includes multiple projection rows 993 and 995, which protrude to face the light guide 911 side and are arranged almost parallel to the projection rows 913 and 915 of the light guide 911. These projection rows 993 and 995 have refracting surfaces 993a and 995a, respectively, which guide the emergent light from the light guide 911 to the liquid crystal panel 101 side, and the angle $\theta 3$ formed between the principal plane of the prism sheet 991 and the refracting surface 993a is set at approximately 35°.

Thus, light source light released towards the edge part of the light guide 911 is controlled as light source light with a converging angle $\Omega 3$ of 22° facing the liquid crystal panel 101 side.

Moreover, the light source light entering from the third light guide plane 921c of the light guide 911 is released from the light guide 911 via the light diffusing sheet 981. The light diffusing sheet 981 is installed on the third region of the light guide to prevent the light source brightness of the third region from being too large compared to those of the first and second regions. Hence, the light diffusing sheet 981 may also be installed between the third light guide plane 921c and the tube light source 951, or the principal plane of the light guide 911 in the third region or the third light guide plane 921c may be made rough like sprinkled lacquer.

With this construction, the liquid crystal display device of this embodiment operates as follows.

The light source light entering from the tube light source 951 into the third light guide plane 921c of the light guide 911 enters the light guide 911 from the third light guide plane 921c and enters the liquid crystal panel 101 via the light diffusing sheet 981 first and then via the prism sheet 991.

Light source light entering the first light guide surface 921a of the light guide 911 propagates inside the light guide 911 and some is released from the exit surface 913b of the first projection row 913. Similarly, light source light entering the second light guide surface 921b of the light guide 911 also propagates inside the light guide 911 and some is released from the exit surface 915b of the second projection row 915.

Thus, the emergent light released from the light guide 911 is controlled to be almost 90° diffused light. The emergent light released from the light guide 911 is then controlled by the prism sheet 991 to be a light source with a converging angle $\Omega 3$ of 22° facing the liquid crystal panel 101.

As described above, according to the liquid crystal display device of this embodiment, the tube light source 951 is stored perpendicular to the light guide 911, which corresponds to the effective display region 103. Thus, the external dimensions of the liquid crystal display device 1 are not restricted by the tube light source 951, thereby realizing a compact display device. In addition, since the light guide 911 is tapered and the X driving circuit boards 811 and 806 are installed in the area of thin board thickness, it is easier to achieve picture frame size for the liquid crystal display device 1.

Moreover, since the tube light source 951 is easily detachable from the back surface or side of the liquid crystal display device, maintenance is easy. For example, if the tube light source and the reflective film 961 are combined into one unit and made detachable from the light guide 911, replacement of light source is easy.

Furthermore, since the converging angle of the light source light from this panel light source device is made small, high usage efficiency and therefore low power consumption can be achieved.

For example, compared to conventional panel light sources wherein a diffusing pattern is installed at the back of the light guide, according to this embodiment, the display brightness in the liquid crystal display device is maximized.

Figure 21:
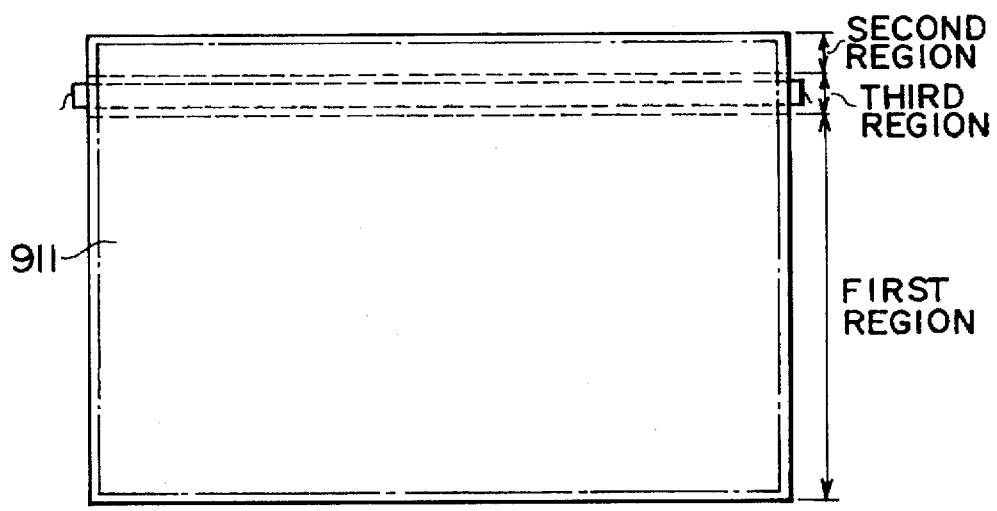
FIG. 21 is a diagram showing another example of the relationship between the light guide and light source with regards to their leveled position, which is different from the one described in the 9th embodiment.

In the examples given in the above-described embodiments, the tube light source 951 is installed at the center of the light guide 911, but the present invention is not limited to this. For instance, as shown in FIG. 21, the tube light source may also be installed in the neighborhood of the edge part of the light guide 911.

Further, in the examples of the above embodiments, the lamp storage groove 921 is installed at the center of the light guide 911 but it could be one that penetrates the light guide.

According to the panel light source device of this invention, high usage efficiency can be achieved and according to the display device using this panel light source device, picture frame size can be realized.

To comply with the statute, the invention has been described in language more or less specific as to structural features shown. However, the means, method and construction herein disclosed comprise the preferred form of several modes of putting the invention into effect and the invention is therefore claimed in any of its forms or modifications within the legitimate and valid scope of the appended claims.

What is claimed is:

1. A light guide having at least one side of a flat substrate as a light entry surface, and a first principal plane of the substrate intersecting the light entry surface as a light exit surface, wherein the improvement comprises:

multiple projections placed within the light exit surface fabricated from materials optically identical with the substrate, each of the projections having a light exit slope farthest among slopes of the projection from the light entry surface, the light exit slope projecting the incident light, and slopes other than the light exit slope fulfilling the conditions for total reflection of incident light.

2. The light guide of claim 1 wherein, from among the light exit main surfaces, all surfaces other than the light exit surface of the projection fulfill the conditions for total reflection of incident light.

3. The light guide of claim 1 wherein all surfaces other than the light exit principal plane fulfill the conditions for total reflection of incident light.

4. The light guide of claim 1 wherein the multiple projections are placed such that the further they are from the light entry surface, the bigger volume they are.

5. The light guide of claim 1 wherein the multiple projections are of identical volume and are fabricated such that the further they are from the light entry surface, the higher density they occupy on the light exit surface.

6. A liquid crystal display device having a liquid crystal panel wherein a liquid crystal layer is held between two parallel boards, and at the back of the panel is installed a light guide having at least one side of a flat substrate as a light entry surface, and a first principal plane of the substrate intersecting the light entry surface as a light exit surface, wherein the improvement comprises:

multiple projections placed within the light exit surface fabricated from materials optically identical with the substrate, each of the projections having a light exit slope farthest among slopes of the projection from the light entry surface, the light exit slope projecting the incident light, and slopes other than the light exit slope fulfilling the conditions for total reflection of incident light; and an optical element that controls the optical path of the emergent light from the light guide interposed between the liquid crystal panel and the light exit surface of the light guide.

7. The liquid crystal display device of claim 6 wherein the pitch of the projection of the light guide is smaller than the pitch of the pixel comprising the liquid crystal panel.

8. The liquid crystal display device of claim 6 wherein the optical element is a prism sheet.

9. The liquid crystal display device of claim 8 wherein the pitch of the prisms comprising the prism sheet is smaller than a pixel comprising the liquid crystal panel.

10. The liquid crystal display device of claim 8 wherein the pitch of the prism comprising the prism sheet is smaller than the pixel comprising the liquid crystal panel and larger than the pitch of the projections of the light guide.

11. The liquid crystal display device of claim 6 wherein the optical element can switch over between a system which transmits emergent light from the light guide and a system which scatters the certain emergent light.

12. The liquid crystal display device of claim 11 wherein the optical element is a polymer dispersing liquid crystal cell.

13. The liquid crystal display device of claim 11 wherein one board of the high polymer liquid crystal has polarizing ability.

14. The liquid crystal display device of claim 6, wherein the optical element that controls the optical path of the emergent light from the light guide is placed on the front face of one of two parallel boards, the front face being seen from the viewing side of said liquid crystal panel.

15. The liquid crystal display device of claim 6, wherein a polarizing element is intervened between the light exit principal plane of the light guide and the light source.

16. A panel light source device comprising a tube light source and a light guide which propagates light from said light tube source, wherein:

said light guide includes multiple projections which are installed on a first principal plane of said light guide and each of the projections has a light reflecting surface and light exiting surface and includes a first reflecting plane and a second reflecting plane on a second principal plane facing the first principal plane, the first and second principal planes intersecting each other at a predetermined angle.

17. The panel light source of claim 16, wherein the first reflecting plane is faced with the projections and the second reflecting plane is faced with the plane among the neighboring projections.

18. A display device comprising a display panel which includes an display region made up of multiple display pixels, and a panel light source which includes a tube light source and a light guide to propagate light from the tube light source, wherein said light guide includes multiple projections on a first principal plane of said light guide, each of which has a light reflecting surface and light exiting surface and includes a first reflecting plane and a second reflecting plane on a second principal plane facing the first principal plane, the first and second principal planes intersecting with each other at a predetermined angle.

19. A panel light source which includes a tube light source and a light guide having multiple projections on a first projection plane, each of the projections having a light reflective slope and a light exiting plane:

wherein said tube light source is stored within the thickness of the light guide, the light guide further including a storage section having a light entry surface fabricated within said thickness to guide light from said tube light source into the light guide.

20. A display device comprising:

a display panel which includes an display region made up of multiple display pixels; and a panel light source which includes a tube light source exposing light onto said display panel and a light guide having multiple projections on the first principal plane, each of the projections having a light reflective slope and a light exiting plane, and optionally releasing light from said tube light source, wherein said tube light source is stored within the thickness of the light guide, the light guide further including a storage section having a light entry surface fabricated within said thickness to guide said light from said tube light source into the light guide.

21. The display device of claim 20, wherein the tube light source is installed to be adapted within said effective display area of said display panel.

22. A display device comprising:

a display panel having a display region made of multiple display pixels;

a driving circuitry that drives said display panel;

a tube light source;

a light guide that includes a light entry surface which is installed near said tube light source and in which light from said tube light source enters;

multiple projections on a first principal plane of the light guide, each of the projections having a light reflective slope and a light exiting plane, wherein said light guide includes a region thinner than the light guide thickness of said light entry surface; and said driving circuitry is installed near said region.

23. A display device wherein each of the projections described in claim 22 has a triangular cross section and includes a first exit surface from which said light source light from said tube light source propagating inside said light guide is released outside said light guide and a first reflection surface which either guides to the first exit surface of said light source, or reflects inside said light guide said light source light from said tube light source propagating inside said light guide.

24. A display device wherein said display panel described in claim 22 and said driving circuitry are electrically connected through a flexible wiring circuit board.

25. A display device wherein said flexible wiring circuit board in claim 24 includes driving ICs.

26. A display device wherein driving ICs are mounted the display panel described in claim 24.

27. A light guide comprising:

a light entry surface;

a first principal plane intersecting the light entry surface; and at least one projection on the first principal plane optically identical with the light guide, the projection having a light emitting surface disposed farthest from the light entry surface and a totally reflective surface disposed closest to the light entry surface.

* * * * *

UNITED STATES PATENT AND TRADEMARK OFFICE
CERTIFICATE OF CORRECTION

PATENT NO. :  5,719,649
DATED      :  February 17, 1998
INVENTOR(S) :  Yasuo SHONO et al.

It is certified that error appears in the above-identified patent and that said Letters Patent is hereby corrected as shown below:

In Claim 18, column 22, line 51, "an display" should read --a display--.

In Claim 20, column 23, line 4, "an display" should read --a display--.

Signed and Sealed this

Twenty-third Day of March, 1999

Attest:

Q. TODD DICKINSON

*Attesting Officer*    *Acting Commissioner of Patents and Trademarks*